US012617417B2

(12) United States Patent
Alexander et al.

(10) Patent No.: US 12,617,417 B2
(45) Date of Patent: May 5, 2026

(54) DYNAMICALLY ADJUSTING INFORMATION PRESENTED TO A DRIVER

(71) Applicant: QUALCOMM Incorporated, San Diego, CA (US)

(72) Inventors: Rachel Gray Alexander, Chicago, IL (US); Shabin Mahadevan, Lake Orion, MI (US); Annika Larsson, Gothenburg (SE)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 18/450,330

(22) Filed: Aug. 15, 2023

(65) Prior Publication Data

US 2025/0058787 A1    Feb. 20, 2025

(51) Int. Cl.
*B60W 50/14* (2020.01)
*B60K 35/21* (2024.01)
(Continued)

(52) U.S. Cl.
CPC .......... *B60W 50/14* (2013.01); *B60W 60/001* (2020.02); *G08G 1/096708* (2013.01); *B60K 35/21* (2024.01); *B60K 2360/166* (2024.01); *B60K 2360/168* (2024.01); *B60K 2360/175* (2024.01); *B60W 2050/146* (2013.01);
(Continued)

(58) Field of Classification Search
CPC .............. B60W 60/001; B60W 50/14; B60W 2756/10; B60W 2556/45; B60W 2554/406; B60W 2050/146; B60W 2520/00; B60W 2540/30; B60K 2360/166;
(Continued)

(56) References Cited

U.S. PATENT DOCUMENTS

2017/0232975 A1    8/2017  Burk
2019/0196851 A1    6/2019  Penilla et al.
(Continued)

FOREIGN PATENT DOCUMENTS

CN        114728584  A      7/2022

OTHER PUBLICATIONS

Lilis Y., et al., "Personalizing HMI Elements in ADAS Using Ontology Meta-Models and Rule Based Reasoning", Lecture Notes in Computer Science, May 2017, pp. 383-401.
(Continued)

*Primary Examiner* — Jay Khandpur
(74) *Attorney, Agent, or Firm* — Polsinelli/Qualcomm Incorporated

(57)                    ABSTRACT

Various embodiments of methods and vehicle processing systems for dynamically adjusting information presented to a driver, may include recognizing when a driver assumes control of a vehicle from an autonomous driving system (ADS) and then performs a driving maneuver within a threshold time that differs from the first driving maneuver by less than a threshold difference. In response, the vehicle processing system may generate an informational cue stored in order to be presented to the driver before the ADS performs another driving maneuver that is consistent with the driving maneuver in which the driver took over control. When such informational cues are presented, the driver's reaction may be monitored and the presented information cue may be adjusted responsive to the driver's reactions.

30 Claims, 11 Drawing Sheets

(51) Int. Cl.
B60W 60/00 (2020.01)
G08G 1/0967 (2006.01)

(52) U.S. Cl.
CPC ..... *B60W 2520/00* (2013.01); *B60W 2540/30*
(2013.01); *B60W 2554/406* (2020.02); *B60W*
*2556/45* (2020.02); *B60W 2756/10* (2020.02)

(58) Field of Classification Search
CPC .............. B60K 2360/168; B60K 35/21; B60K
2360/175; G08G 1/096708
See application file for complete search history.

(56) References Cited

U.S. PATENT DOCUMENTS

| | | |
|---|---|---|
| 2019/0283672 A1 | 9/2019 | Daman |
| 2020/0334479 A1 | 10/2020 | Szczerba |
| 2021/0229707 A1 | 7/2021 | Akash et al. |
| 2021/0276585 A1* | 9/2021 | Krome ................. G05D 1/0088 |
| 2021/0407319 A1* | 12/2021 | Urano ............... B60W 60/0059 |
| 2022/0028293 A1 | 1/2022 | Urano et al. |
| 2022/0289248 A1* | 9/2022 | Niewiadomski ....... B60K 35/10 |
| 2023/0063354 A1 | 3/2023 | Sun et al. |
| 2024/0109539 A1* | 4/2024 | Lee ................... B60W 30/0956 |
| 2024/0217539 A1* | 7/2024 | Fink ....................... B60K 35/00 |
| 2024/0317304 A1* | 9/2024 | Oba ................. B60W 50/0097 |
| 2025/0046124 A1* | 2/2025 | Mateer ................. G07B 11/00 |

OTHER PUBLICATIONS

International Search Report and Written Opinion—PCT/US2024/
037577—ISA/EPO—Oct. 10, 2024.

* cited by examiner

400a

400b

400c

500a

Recognize That A Driver Assumes Control Of Vehicle During An ADS-Initiated First Driving Maneuver And Then Performs A Driving Maneuver Within A Threshold Time That Differs From The First Driving Maneuver By Less Than A Threshold Difference — 502

Generate A First Informational Cue In Response To Determining That The Driver Performed A Driving Maneuver Within A Threshold Time That Differs From The First Driving Maneuver By Less Than A Threshold Difference — 504

Present To The Driver The First Informational Cue Before The ADS Performs Another ADS Planned Driving Maneuver That Is Consistent With The First Driving Maneuver — 506

FIG. 5A

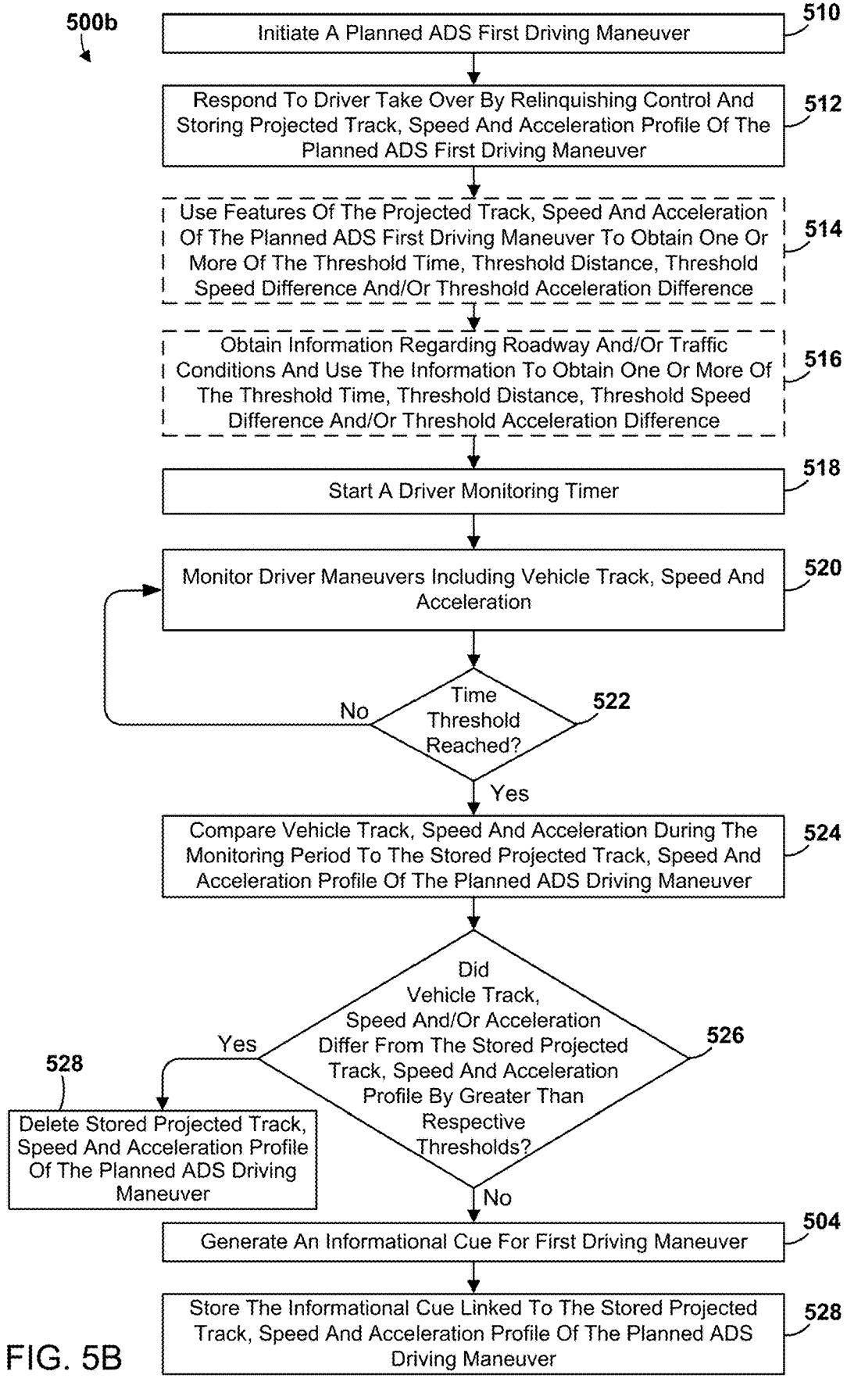

Initiate A Planned ADS First Driving Maneuver — 510

Respond To Driver Take Over By Relinquishing Control And Storing Projected Track, Speed And Acceleration Profile Of The Planned ADS First Driving Maneuver — 512

Use Features Of The Projected Track, Speed And Acceleration Of The Planned ADS First Driving Maneuver To Obtain One Or More Of The Threshold Time, Threshold Distance, Threshold Speed Difference And/Or Threshold Acceleration Difference — 514

Obtain Information Regarding Roadway And/Or Traffic Conditions And Use The Information To Obtain One Or More Of The Threshold Time, Threshold Distance, Threshold Speed Difference And/Or Threshold Acceleration Difference — 516

Start A Driver Monitoring Timer — 518

Monitor Driver Maneuvers Including Vehicle Track, Speed And Acceleration — 520

Time Threshold Reached? — 522     No     Yes

Compare Vehicle Track, Speed And Acceleration During The Monitoring Period To The Stored Projected Track, Speed And Acceleration Profile Of The Planned ADS Driving Maneuver — 524

Did Vehicle Track, Speed And/Or Acceleration Differ From The Stored Projected Track, Speed And Acceleration Profile By Greater Than Respective Thresholds? — 526     Yes     No Delete Stored Projected Track, Speed And Acceleration Profile Of The Planned ADS Driving Maneuver — 528

Generate An Informational Cue For First Driving Maneuver — 504

Store The Informational Cue Linked To The Stored Projected Track, Speed And Acceleration Profile Of The Planned ADS Driving Maneuver — 528

500d

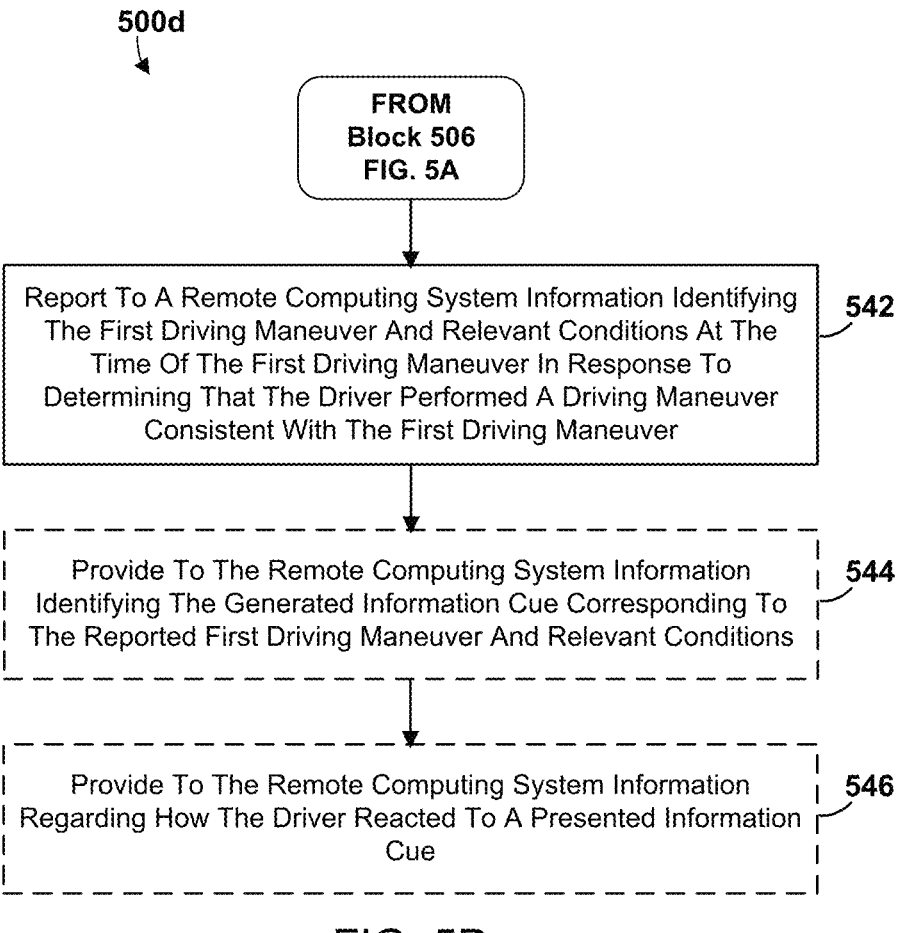

FROM
Block 506
FIG. 5A

Report To A Remote Computing System Information Identifying The First Driving Maneuver And Relevant Conditions At The Time Of The First Driving Maneuver In Response To Determining That The Driver Performed A Driving Maneuver Consistent With The First Driving Maneuver    542

Provide To The Remote Computing System Information Identifying The Generated Information Cue Corresponding To The Reported First Driving Maneuver And Relevant Conditions    544

Provide To The Remote Computing System Information Regarding How The Driver Reacted To A Presented Information Cue    546

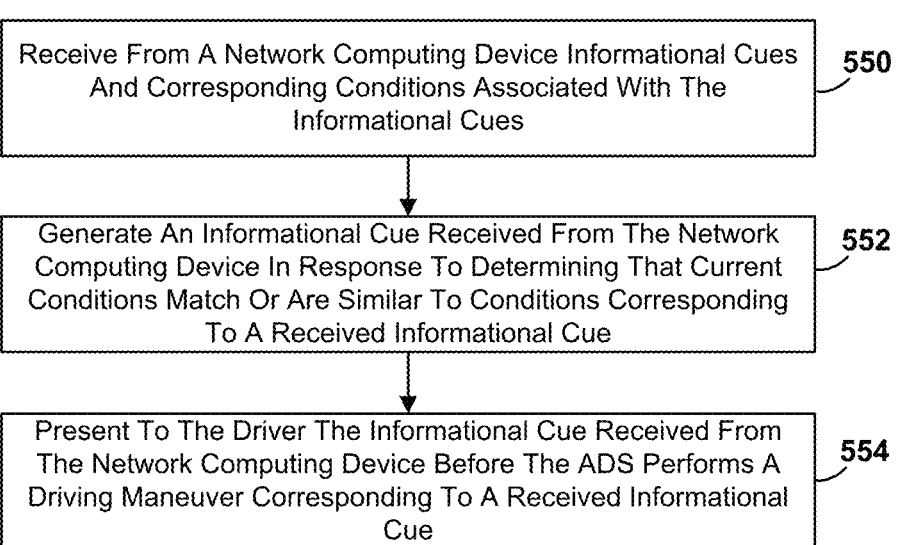

| Receive From A Network Computing Device Informational Cues And Corresponding Conditions Associated With The Informational Cues | 550 |

| Generate An Informational Cue Received From The Network Computing Device In Response To Determining That Current Conditions Match Or Are Similar To Conditions Corresponding To A Received Informational Cue | 552 |

| Present To The Driver The Informational Cue Received From The Network Computing Device Before The ADS Performs A Driving Maneuver Corresponding To A Received Informational Cue | 554 |

DYNAMICALLY ADJUSTING INFORMATION PRESENTED TO A DRIVER

BACKGROUND

Sophisticated computing systems that perform automated driving functions are rapidly being incorporated in vehicles around the world. Such driving automation systems can evaluate information about the driving environment, make path planning and maneuver decisions, and execute vehicle maneuvers related to vehicle speed, distance and lane keeping, lane changes, and other such maneuvers. A human driver should remain aware of the driving environment to handle scenarios that the system is not designed to address. The human driver may assume control of the vehicle, for example, if the driver disagrees with a maneuver that the computing system has planned or is executing.

SUMMARY

Various aspects include methods that may be performed by a vehicle processing system for dynamically adjusting information presented to a driver based on driver responses to autonomous driving maneuvers. Various aspects include recognizing when a driver assumes control of a vehicle from an autonomous driving system (ADS) during an ADS-initiated first driving maneuver and then performs a driving maneuver within a threshold time that differs from the first driving maneuver by less than a threshold difference, and presenting to the driver a first informational cue before the ADS performs another driving maneuver that is consistent with the first driving maneuver in response to recognizing that the driver performed a driving maneuver within the threshold time that differed from the first driving maneuver by less than the threshold difference.

Some aspects may further include generating the first informational cue in response to recognizing that the driver performed a driving maneuver within the threshold time that differed from the first driving maneuver by less than the threshold difference, and storing the generated first informational cue for presentation to the driver before the ADS performs another ADS planned driving maneuver consistent with the first driving maneuver.

In some aspects, recognizing that the driver performed the driving maneuver within the threshold time that differed from the first driving maneuver by less than the threshold difference may include monitoring driver actions taken after assuming control of the vehicle for the threshold time, and recognizing the driver performed a driving maneuver during the threshold time that exhibited one or more of a track of the vehicle differing from a planned track of the first driving maneuver by less than a threshold distance, a speed of the vehicle during the driver performed driving maneuver differing from a speed of the vehicle during the first driving maneuver by less than a threshold speed difference, or an acceleration of the vehicle differing from an acceleration of the first driving maneuver by less than a threshold acceleration difference. Some aspects may further include using vehicle track, speed, and acceleration features of the first driving maneuver to obtain one or more of the threshold time, the threshold distance, the threshold speed difference, or the threshold acceleration difference. Some aspects may further include obtaining information regarding roadway conditions and traffic conditions when the ADS initiated the first driving maneuver, and using the information regarding roadway conditions and traffic conditions to obtain one or more of the threshold time, the threshold distance, the threshold speed difference, or the threshold acceleration difference.

In some aspects, another ADS planned driving maneuver that is consistent with the first driving maneuver may include an ADS planned driving maneuver that includes one or more of a driving maneuver with a steering action that is within a threshold difference of a steering action of the first driving maneuver and includes one or more of a vehicle speed within threshold speed difference of a vehicle speed at the time of the first driving maneuver, a similar signaling action as during the first driving maneuver, or a similar traffic condition as during the first driving maneuver. In some aspects, the first informational cue may include information describing an ADS planned driving maneuver that is consistent with the first driving maneuver.

Some aspects may further include monitoring driver reactions to the first informational cue presented to the driver before a planned driving maneuver that is consistent with the first driving maneuver, adjusting the first informational cue if a driver reaction indicates the driver reacted negatively to the first informational cue, and storing the adjusted first informational cue for presentation to the driver the next time the ADS plans to perform a driving maneuver consistent with the first driving maneuver.

In some aspects, the first informational cue may be stored in a data structure of informational cues linked to a plurality of ADS driving maneuvers that the vehicle processing system can access to obtain an appropriate informational cue for presentation to the driver before the ADS performs a corresponding planned driving maneuver.

Some aspects may further include reporting to a remote computing system information identifying the first driving maneuver and relevant conditions at the time of the first driving maneuver in response to recognizing that the driver performed a driving maneuver within the threshold time that differed from the first driving maneuver by less than the threshold difference. Some aspects may further include receiving, from a network computing device, information about informational cues and conditions associated with the informational cues, and presenting to the driver an informational cue received from the network computing device before the ADS performs another driving maneuver in response to determining that an ADS planned driving maneuver under conditions match or are similar to a driving maneuver and conditions associated with the informational cue. Further aspects include a processing system of a vehicle including a memory and a processor configured to perform operations of any of the methods summarized above. Further aspects may include a processing system of a vehicle having various means for performing functions corresponding to any of the methods summarized above. Further aspects may include a non-transitory processor-readable storage medium having stored thereon processor-executable instructions configured to cause a processing system of a vehicle to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

FIG. 5A is a process flow diagram illustrating an embodiment method performed by a processor of a vehicle processing system in a vehicle for dynamically adjusting information presented to a driver in accordance with various embodiments.

FIGS. 5B-5E are process flow diagrams of illustrating example operations that may be performed as part of the embodiment method illustrated in FIG. 5A in accordance with various embodiments.

DETAILED DESCRIPTION

Figure 1:
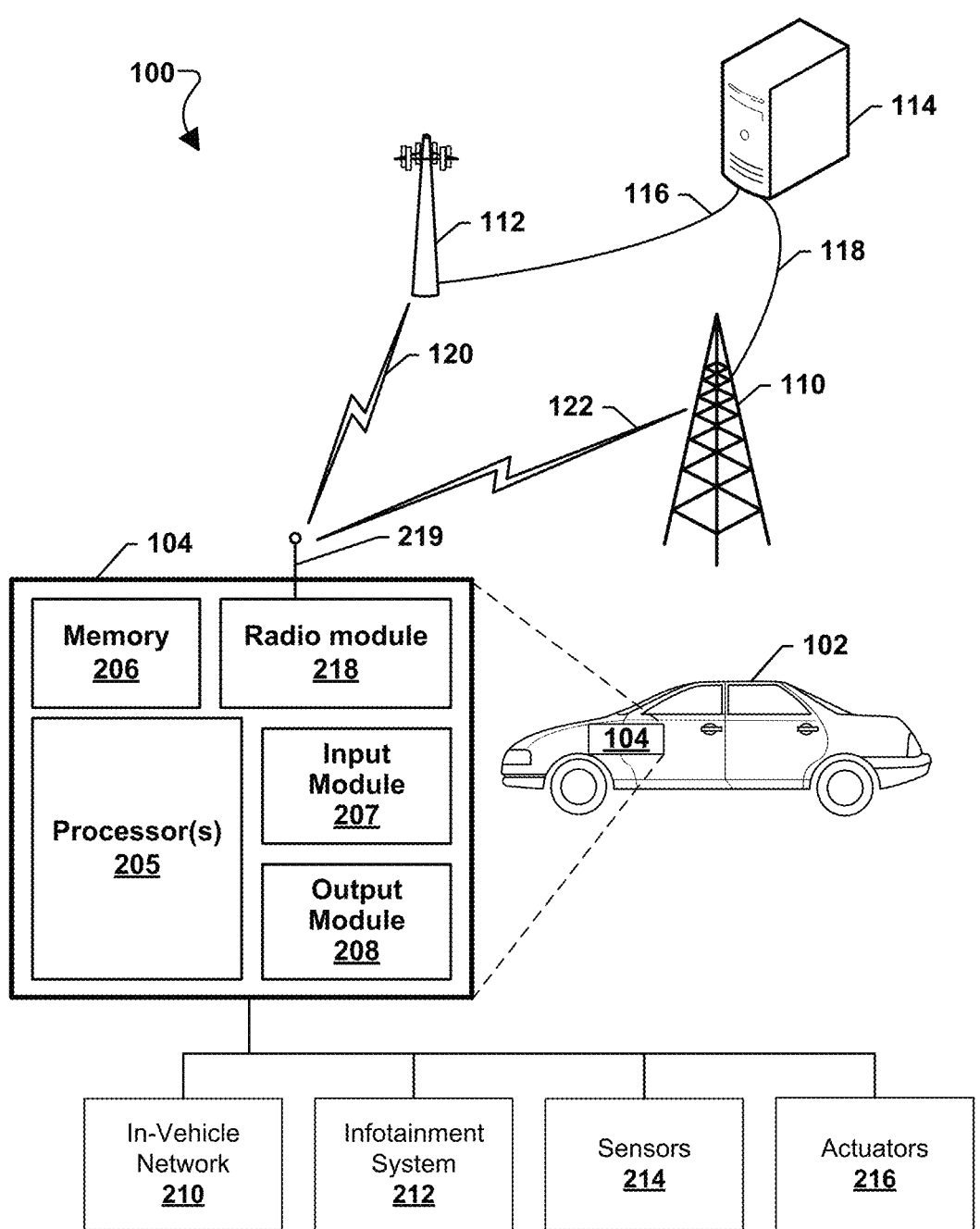
FIG. 1 is a component diagram of an example vehicle processing system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and vehicle processing systems configured to perform the methods of dynamically adjusting information presented to a particular driver responsive to how that driver responds to autonomous driving maneuvers. In various embodiments, a vehicle processing system (such as a processing system within or coupled to a vehicle's ADS) may include one or more processors and/or other components configured to perform various operations for adjusting information presented to the driver prior to or during an autonomous driving maneuver planned or performed by the vehicle's ADS. In various embodiments, the vehicle processing system may learn circumstances in which the particular driver takes over driving (i.e., assumes control of the vehicle, such as via a takeover command (TOC)) but then performs a very similar driving maneuver as the ADS was performing. In response to recognizing when the driver has taken over control of the vehicle prior to or during an ADS-initiated maneuver but then performed a consistent driving maneuver, the vehicle processing system may generate an informational cue or signal that can be presented to the driver before the ADS performs another similar driving maneuvers. By providing such an informational cue or notification to the driver before such maneuvers the ADS may build driver trust in the ADS.

As used herein, the term "vehicle" refers generally to any of an automobile, motorcycle, truck, bus, boat, and any other type of vehicle that may be configured with a processing system for managing driver engagement.

As used herein, the terms "processor," "processing system," and "computing system" may include one or more processors, including multiprocessor systems. Various embodiment methods may be implemented in one or more of multiple processors within a vehicle processing system.

The term "system on chip" (SOC) is used herein to refer to a single integrated circuit (IC) chip that contains multiple resources and/or processors integrated on a single substrate.

A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

Vehicles are increasingly being configured with sophisticated computing systems that perform automated driving functions such as Advanced Driver Assistance Systems (ADAS) that provide various forms of assistance to drivers, and autonomous driving systems (ADS) that can autonomously operate the vehicle subject to the driver's supervision. An ADS can evaluate information about the driving environment, make path planning and maneuver decisions, and execute vehicle driving maneuvers including, for example, autonomous steering, vehicle speed control, lane keeping, lane changes, and other driving maneuvers. As used herein, a "driving maneuver" includes any and all changes in speed, acceleration, braking, signals, and steering actions, that result or would result in a track of the vehicle in the roadway or with respect to other vehicles on the roadway.

Gaining the driver's trust in the ADS is important for widespread adoption and use of ADS vehicle systems. A driver may assume control of the vehicle (e.g., by inputting a takeover command (TOC)), for example, if the driver disagrees with a maneuver that the ADS has planned or is executing. The capability of the driver to assume control of the vehicle is an important safety feature, as no ADS is infallible and some driving conditions are too challenging for current ADS technology. However, a driver who does not understand the ADS driving maneuver, or who does not sufficiently trust the ADS system, may take control of the vehicle when an ADS driving maneuver is safe and appropriate for the driving context. A driver suspicious or concerned about an ADS driving maneuver may take over control of the vehicle at any time during the sequence of actions of the driving maneuver (e.g., slowing down, speeding up, signaling, etc.), and not just during a steering action.

Various embodiments include methods and vehicle processing systems configured to perform the methods of dynamically adjusting information presented to a driver to help build trust in an ADS by notifying the driver prior to or during autonomous driving maneuvers similar to maneuvers that prompted the driver to take control of the vehicle in a manner that suggested the driver was uncomfortable with the ADS performing the maneuver. The vehicle processing system may dynamically adjust such information presented to driver to increase driver confidence in the ADS and reduce the frequency of unnecessary control takeovers by the driver by learning circumstances in which the driver takes over driving due to a lack of trust in the system, and dynamically generating or adjusting an informational cue or signal presented to the driver before such maneuvers to build driver trust in the system and to decrease driver takeovers. The informational cues or signals generated in various embodiments may vary depending upon the type of maneuver that the ADS is planning to perform, such as presenting one form of cue (e.g., a tone) before reducing or increasing speed and/or presenting a haptic cue (e.g., steering wheel vibration) prior to performing a steering maneuver (e.g., lane change).

In various embodiments, the vehicle processing system may monitor driver performed maneuvers for a period after the driver takes over control when the ADS initiates an ADS planned driving maneuver. The vehicle processing system may monitor the vehicle track, speed and acceleration under driver control for a period of time to recognize whether the driver performs a driving maneuver that is substantially the same as the ADS planned driving maneuver (referred to herein as the "the first driving maneuver"). This monitoring may involve comparing the vehicle track, speed and acceleration during a monitoring time following the driver take over to the vehicle track, speed and acceleration of the interrupted ADS planned driving maneuver to determine a distance, speed or acceleration difference between the driver executed maneuver and the ADS planned maneuver. An unnecessary take over, and thus a likelihood that the takeover was prompted by driver distrust of the ADS, may be recognized if one or more of the vehicle track, speed and acceleration features of the driver executed maneuver was less than or within a respective threshold of the ADS planned driving maneuver. In some embodiments, the processing system may determine whether the observed vehicle track was within a track difference distance threshold of the track of the planned ADS driving maneuver, whether the observed vehicle velocity was within a velocity difference threshold of the velocity of the planned ADS driving maneuver, and whether the observed vehicle acceleration was within an acceleration difference threshold of the track of the planned ADS driving maneuver. As the risks and difficulty of any driving maneuver depends upon the type of maneuver and the speed of the vehicle, the track difference distance threshold, velocity difference threshold, and acceleration difference threshold may vary and may be determined by the processing system based on the ADS planned driving maneuver. Also, roadway conditions (e.g., number of lanes, roadway features, pavement conditions, etc.) and traffic conditions (e.g., traffic density, type of nearby vehicles, etc.) can influence the difficulty of maneuvers, so in some embodiments the processing system may use such features in identifying the appropriate track difference distance threshold, velocity difference threshold, and acceleration difference threshold to use while monitoring the driver actions.

In response to determining that the driver performed the maneuver that the ADS had planned, the vehicle processing system may determine that the driver assumed control of the vehicle because the driver did not understand or trust the driving maneuver being performed by the ADS, or that the driver did not trust the ADS. By recognizing such situations, the vehicle processing system may learn when and how to generate an informational cue to inform the driver before similar maneuvers in the future, such as an element of a human machine interface (HMI) display, sound, and/or haptic. The vehicle processing system may present the new informational cue the next time the same or a similar maneuver is planned by the ADS. In this manner, the vehicle processing system and ADS may build driver trust in the ADS, and thus reduce the frequency that the driver unnecessarily takes control of the vehicle from the ADS.

In some embodiments, the vehicle processing system may use a machine learning system to monitor driver takeovers from the ADS to learn circumstances in which the driver takes over driving and then performs a consistent maneuver, which could have been prompted by a lack of trust in the ADS. Also, in some embodiments, the vehicle processing system may use a machine learning system to adapt, adjust, or generate an informational cue for presentation to the driver before subsequent similar maneuvers.

As described above, the vehicle processing system may recognize when a driver assumes control of a vehicle from the ADS unnecessarily during a first driving maneuver by initiating the first driving maneuver that is planned by the ADS, recognizing that the driver takes control of the vehicle while the ADS performs the first driving maneuver, and monitoring driver actions after taking control to determine whether the driver performed a maneuver consistent with the first driving maneuver. Monitoring driver actions to determine whether the driver performed a maneuver consistent with the first driving maneuver may involve observing driving actions taken by the driver for a threshold amount of time, such as during the ensuing one or two minutes, and comparing driving maneuvers performed by the driver, and particularly the vehicles track with respect to the roadway and/or surrounding traffic, as well as speed and acceleration, to the first driving maneuver that was planned by the ADS. The amount of time that the vehicle processing system should monitor driver maneuvers and vehicle track, speed and acceleration after driver takeover may depend on the type of driving maneuver planned by the ADS. Maneuvers that are relevant to traffic that is moving along with the vehicle (e.g., lane changes, passing slower vehicles, moving over to allow faster vehicles to pass, etc.) may be made several seconds and even minutes after the driver takes over and be consistent with the driving maneuver planned by the ADS. However, maneuvers that depend on or are responsive to a feature in the roadway (e.g., an exit ramp, lane merge, avoiding an obstacle in the roadway, responding to emergency vehicles, etc.) must be performed by the time such roadway features are approached, and thus the appropriate monitoring time may be a matter of a few seconds, depending on vehicle speed. Thus, in some embodiments, the processing system may determine the threshold period of time based on the type, nature or context of the driving maneuver planned by the ADS.

In addition to the features of vehicle track, speed and acceleration of a planned driving maneuver, the context of the maneuver may also affect whether the driver trusts the ADS to perform the maneuver. In particular, the roadway and traffic conditions at the time of a planned driving maneuver may influence the driver's perception of the difficulty of a maneuver. For example, when the roadway is straight and smooth and there are few other vehicles nearby, a driver may be more comfortable with the ADS performing a given maneuver (e.g., a lane change or passing a slow moving truck) than when the ADS plans the same maneuver on a roadway that is curved or in rough conditions and/or there are several vehicles nearby. As used herein, the term "traffic condition" is used to refer generally to the number, type and closeness of surrounding vehicles considering roadway lane configurations. Traffic conditions that may be relevant to presenting an informational cue include the type of vehicles (e.g., trucks versus automobiles), the density (i.e., number and spacing) of nearby vehicles, variability in vehicle speeds (e.g., stop-and-go traffic, vehicles traveling at different speed, etc.), and the like. The impact of traffic conditions on decision making of various embodiments may also depend on roadway conditions such as the number of lanes of traffic in the same direction, whether opposing traffic is in an adjacent lane or separated by a barrier, the presence of entrance or merging lanes, the presence of exit ramps, and the like. Other factors that may affect a drivers confidence in the ADS to perform maneuvers autonomously include weather conditions (e.g., rain, snow, fog, etc.), time of day, etc.

In response to determining that the driver performed a driving maneuver consistent with the first driving maneuver within the threshold time, the vehicle processing system may generate an informational cue based on or responsive to the driving circumstances (traffic and road conditions, type of maneuver, etc.), and store the generated informational cue (sometimes referred to as a "first informational cue") for presentation to the driver before the ADS performs another driving maneuver that is consistent (e.g., similar maneuver under similar driving conditions) with the first driving maneuver. A driving maneuver that is consistent with the first driving maneuver may be recognized by the vehicle processing system as a planned driving maneuver that involves a similar driving context as defined by roadway conditions and surrounding traffic and one or more of a similar vehicle speed, a similar signaling action, or a similar steering action as in the first driving maneuver.

In some embodiments the vehicle processing system may use a generative artificial intelligence (AI) process, or refer to a set of default informational cues, to generate the informational cue or explanation of the maneuver that will be presented the next time the ADS plans a similar maneuver. In some embodiments, the vehicle processing system may apply a machine learning process the next time the ADS plans a similar maneuver based on whether the driver again takes over, or acts nervous or appears calm, and using the machine learning process to update or revise the informational cue accordingly. In some embodiments, a different informational cue may be generated and/or include information describing the planned driving maneuver that is consistent with each different autonomous driving maneuver that prompted an unnecessary driver takeover.

In some embodiments, the vehicle processing system may configure the first informational cue in response to determining that the driver performed a maneuver consistent with the first driving maneuver. The vehicle processing system may store the generated first informational cue for presentation to the driver before the ADS performs another driving maneuver consistent with the first driving maneuver. In some embodiments, a driving maneuver that is consistent with the first driving maneuver includes a driving maneuver planned by the ADS that involves a similar driving context and one or more of a similar vehicle speed, a similar signaling action, or a similar steering action as in the first driving maneuver. A similar driving context may include similar road conditions, similar traffic conditions, similar weather conditions, and other similar conditions, alone or in any combination. In some embodiments, the vehicle processing system may determine similarity of conditions, contexts and maneuvers within a threshold value or a range of values.

In some embodiments, the vehicle processing system may identify a driver reaction to the first informational cue presented to the driver before the planned driving maneuver that is consistent with the first driving maneuver, and may adjust the first informational cue based on the identified driver reaction. In some embodiments, identifying the driver's reaction to the first informational cue may include identifying one or more driver behaviors that indicate whether the driver trusts the first informational cue, and adjusting the first informational cue in response to identifying one or more driver behaviors that indicate that the driver does not trust the first informational cue. In some embodiments, the vehicle processing system may store the adjusted first informational cue for presentation to the driver the next time the ADS plans to perform a driving maneuver consistent with the first driving. In this manner, the vehicle processing system may learn how to present informational cues to particular drivers that help to build the driver's trust in the ADS.

For example, the vehicle processing system may receive one or more inputs from sensors of a driver monitoring system (DMS) that may receive images (e.g., from a camera), sound (e.g., from a microphone), haptic information (e.g., from the steering wheel or other vehicle controls and/or input devices) and other information about the driver and, based on such inputs, identify the driver's reaction to the first informational cue when presented. Non-limiting examples of driver reactions to informational cues include: facial expressions associated with disfavor, dissatisfaction, fear, annoyance, and the like; vocal emissions associated with disfavor, dissatisfaction, fear, annoyance, and the like; increased or excessive pressure applied to the steering wheel from the driver's grip (e.g., measure with pressure sensitive materials); shifting of the driver in the seat (e.g., measure with seat pressure sensors); pressure applied to the floor by the driver's left foot; and combinations of any of these. When making adjustments to informational cues, the vehicle processing system may also recognize and take into consideration indications of driver acceptance of informational cues, such as verbal utterances and facial expressions associated with agreement, satisfaction, trust, relaxation, and the like.

An illustrative example of an autonomous driving maneuver that might prompt a driver to takeover control but then perform the planned maneuver manually is a lane change maneuver. If the driver does not trust the ADS, then when the vehicle slows or accelerates to match an opening between vehicles in the adjacent lane, the driver may take over driving if the driver thinks the speed change is inappropriate, not appreciating that the speed changes were proper preparation for the lane change. Then after taking control the driver may perform the lane change, thus performing a driving maneuver consistent with the driving maneuver that was planned by the ADS. In response to determining that the driver performed a driving maneuver consistent with the first driving maneuver, the vehicle processing system may generate an informational cue to be presented to the driver the next time the ADS is about to perform a similar lane change.

As another illustrative example of an autonomous driving maneuver that might prompt a driver to takeover control but then perform the planned maneuver manually is the lane offset by the vehicle when passing multiple trucks in a parallel adjacent lane. In a situation in which multiple trucks are separated by interspersed cars, the ADS may plan and begin a driving maneuver that positions the vehicle offset from the centerline of its lane of travel to pass multiple trucks with greater separation distance. When the vehicle passes an interspersed car but does not steer back to the centerline of the vehicles lane of travel, a driver distrusting the ADS may take control to steer the vehicle to align with the centerline, not realizing the plan to pass multiple trucks in the same maneuver. If the driver then steers the vehicle to a similar offset from the centerline to pass the next and subsequent trucks, such driver performed maneuvers, if performed within the monitoring period following driver takeover, may be recognized by the processing system. In response, the processing system or ADS may generate an informational cue to be presented to the driver the next time the ADS plans to pass multiple trucks under similar circumstances in which the cue explains the need to drive offset from the centerline while passing multiple trucks without swerving.

As another illustrative example of an autonomous driving maneuver that might prompt a driver to takeover control but then perform the planned maneuver manually involves a delay in passing a slow moving vehicle. The ADS system may be planning to pass the slow moving vehicle, but with knowledge of oncoming traffic not visible to the driver may delay initiating the passing maneuver. A driver distrusting the ADS and unaware of the oncoming traffic might take control of the vehicle and begin a passing maneuver. If the driver immediately steers back into the vehicle's own lane of traffic after seeing the oncoming traffic, waits until that traffic passes and then passes the slow moving vehicle ahead, such driver performed maneuvers may be recognized by the processing system. In response, the processing system or ADS may generate an informational cue to be presented to the driver the next time the ADS plans to pass vehicle but is delaying to allow oncoming traffic to pass in which the cue explains plans to pass and the presence of oncoming traffic that is delaying that maneuver.

As another illustrative example of an autonomous driving maneuver that might prompt a driver to takeover control but then perform the planned maneuver manually involves the ADS not taking advantage of an open lane of travel because the ADS has knowledge that the open lane is blocked or ends (e.g., merges into current lane) ahead. A driver seeing an adjacent open lane of travel and unaware that that lane is blocked or ends up ahead may take over control of the vehicle and manually change lanes. If the driver steers back into the original lane of traffic after seeing that the open lane is blocked or ending, such driver performed maneuvers may be recognized by the processing system. In response, the processing system or ADS may generate an informational cue to be presented to the driver the next time the vehicle is in a similar roadway condition in which the cue informs the driver that the adjacent lane is blocked or ends up ahead, thereby informing the driver why the ADS is not changing lanes.

The various embodiments described above may also be applied to develop new informational cues for drivers by the vehicle processing system sharing with a remote computing device, such as a vehicle fleet management server or a crowdsource server. In this manner, multiple vehicles and drivers can benefit from the experience of one driver who took over from an autonomous driving system at a time that caused nervousness or distrust in the system, with the generated informational cue made available to other drivers without those other driver having to have experienced the anxiety that lead to the unnecessary driver takeover.

To implement this capability on a fleet-basis or via crowdsourcing, the vehicle processing system may communicate the circumstances at the time of an unnecessary driver takeover (e.g., planned autonomous driving maneuver, vehicle speed and other conditions, roadway conditions, surrounding traffic conditions, etc.) to a fleet management server or crowdsource server (e.g., 114). In some embodiments, the fleet or crowdsourced system may compile this information and generate suitable informational cues that are then distributed to processing system in other vehicles in the fleet or subscribing to the crowdsource service. In some embodiments, the vehicle processing system may be configured to also receive information from vehicle processing systems reporting how drivers responded to provided informational cues so such information can be used to adjust the informational cues to be more useful and acceptable to drivers, and then provide the updated informational cues to vehicles in the fleet or subscribing to the crowdsource service.

Correspondingly, in some embodiments, the vehicle processing system may be configured to receive from a fleet management server or crowdsource service information regarding informational cues and the conditions (e.g., planned driving maneuver, vehicle conditions, roadway conditions, traffic conditions, etc.) when such informational cues should be presented to drivers. In such embodiments, the vehicle processing system may be configured to use the received information to configure and present an informational cue to vehicle drivers under corresponding conditions when other drivers exhibit signs of not trusting the ADS.

Various embodiments may be performed each time the driver takes over control of the vehicle unnecessarily, and thus learn over time how to present different informational cues appropriate for each of different autonomous driving maneuvers. For example, the vehicle processing system may recognize that the driver assumes control of the vehicle from the ADS and then performs the planned maneuver manually during another (i.e., a second) driving maneuver planned by the ADS that is different from the first driving maneuver in a similar manner. Similar to the operations described for the first driving maneuver, the ADS may initiate a second, different driving maneuver that is planned by the ADS, recognize that the driver takes control of the vehicle while the ADS performs the another (i.e., a second) driving maneuver, and monitor driver actions and vehicle track/speed/acceleration after taking control to determine whether the driver performed a maneuver consistent with the another (i.e., a second) driving maneuver. In response to determining that the driver performing a driving maneuver consistent with the planned another (i.e., a second) driving maneuver, the vehicle processing system may generate another (i.e., a second) informational cue that is different from the first informational cue that will be presented to the driver before the ADS performs a driving maneuver that is consistent with the another (i.e., a second) driving maneuver in the future. In some embodiments, the vehicle processing system may store the first and second informational cues in a database for use in informing the driver (e.g., presenting an output to the driver) before the ADS performs corresponding planned driving maneuvers.

Various embodiments improve the safety and operation of vehicles by enabling vehicle processing systems to dynamically evaluate driver takeovers from an ADS in relation to the driving environment or context and vehicle maneuvers planned or executed by the ADS. Various embodiments improve the safety and operation of vehicles by enabling vehicle processing systems to perform operations to improve information presented to drivers, and to encourage driver use of, engagement with, and/or trust in vehicle ADS systems.

FIG. 1 is a component diagram of an example vehicle processing system 100 including a suitable for implementing various embodiments. The processing system 100 may include a vehicle 102 that includes a vehicle processing system 104. The vehicle processing system 104 may communicate with various systems and devices, such as an in-vehicle network 210, an infotainment system 212, various sensors 214, various actuators 216, and a radio module 218 coupled to an antenna 219. The vehicle processing system 104 also may communicate with roadside units 112, cellular communication network base stations 110, and other external devices, e.g., via wireless communication links 120 and 122. The vehicle processing system 104 also may communicate with a network computing device 114 via the roadside units 112 and/or the cellular communication network base stations 110, e.g., via wired communication links 116 and 118. The network computing device 114 may be part of a communication network (e.g., a core network), or may be configured to communicate via a communication network with the roadside units 112, cellular communication network base stations 110, and the vehicle processing system 104.

The vehicle processing system 104 may include one or more processors 205 coupled to memory 206, an input module 207, an output module 208 and the radio module 218. The one or more processors 205 may be coupled to the memory 206 (i.e., a non-transitory storage medium), and may be configured with processor-executable instructions stored in the memory 206 to perform operations of the methods according to various embodiments described herein. Also, the one or more processors 205 may be coupled to the output module 208, which may control in-vehicle displays, and to the input module 207 to receive information from vehicle sensors as well as driver inputs.

The vehicle processing system 104 may include a V2X antenna 219 coupled to the radio module 218 that is configured to communicate with one or more ITS participants (e.g., stations), a roadside unit 112, and a base station 110 or another suitable network access point. The V2X antenna 219 and radio module 218 may be configured to receive dynamic traffic flow feature information via vehicle-to-everything (V2X) communications. In various embodiments, the vehicle processing system may receive information from a plurality of information sources, such as the in-vehicle network 210, infotainment system 212, various sensors 214, various actuators 216, and the radio module 218. The vehicle processing system may be configured to perform autonomous or semi-autonomous driving functions using map data in addition to sensor data, as further described below.

Examples of an in-vehicle network 210 include a Controller Area Network (CAN), a Local Interconnect Network (LIN), a network using the FlexRay® protocol, a Media Oriented Systems Transport (MOST) network, and an Automotive Ethernet network. Examples of vehicle sensors 214 include a location determining system (such as a Global Navigation Satellite Systems (GNSS) system, a camera, radar, lidar, ultrasonic sensors, infrared sensors, and other suitable sensor devices and systems. Examples of vehicle actuators 216 include various physical control systems such as for steering, brakes, engine operation, lights, directional signals, and the like.

Figure 2:
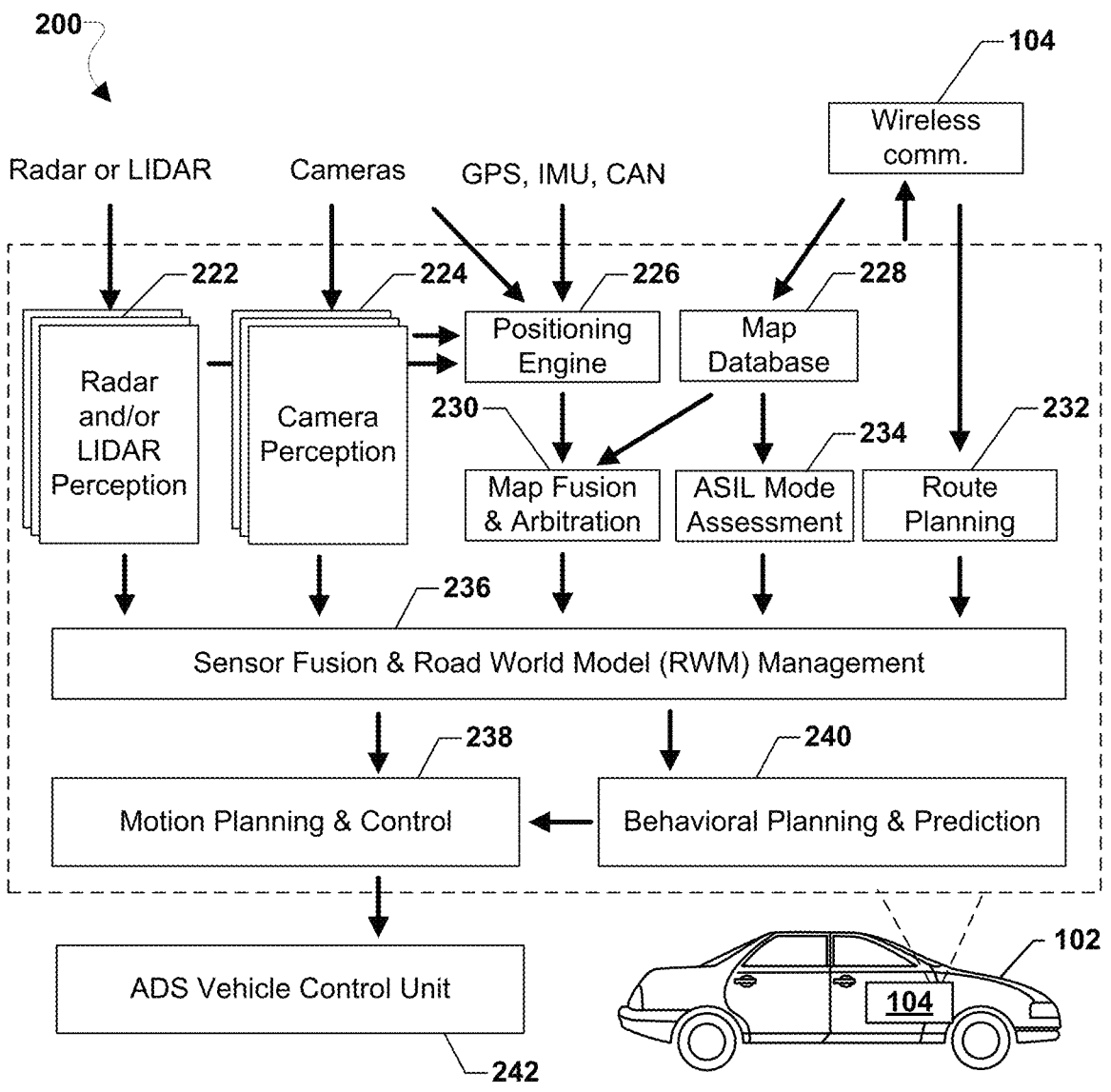
FIG. 2 is a component block diagram illustrating components of an example vehicle processing system suitable for implementing various embodiments.

FIG. 2 is a component block diagram illustrating components of an example vehicle processing system 200 suitable for implementing various embodiments. With reference to FIGS. 1-2, the vehicle processing system 200, which may include an autonomous or semiautonomous driving system, may be coupled to the vehicle processing system 104.

The vehicle processing system 200 may include various subsystems, communication elements, computational elements, computing devices or units which may be utilized within a vehicle 102. The various computational elements, computing devices or units within the vehicle processing system 200 may be implemented within a system of computing devices (i.e., subsystems) that communicate data and commands to each other via the in-vehicle network 210 (e.g., indicated by the arrows in FIG. 2). In some implementations, the various computational elements, computing devices or units within the vehicle processing system 200 may be implemented within a single computing device, such as separate threads, processes, algorithms or computational elements. Therefore, each subsystem/computational element illustrated in FIG. 2 is also generally referred to herein as a "layer" within a computational "stack" that constitutes the vehicle processing system 200. However, the use of the terms layer and stack in describing various embodiments are not intended to imply or require that the corresponding functionality is implemented within a single vehicle computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

The vehicle processing system 200 may include a radar and/or lidar perception layer 222, a camera perception layer 224, a positioning engine layer 226, a map database 228, a map fusion and arbitration layer 230, a route planning layer 232, an operating mode assessment layer 234, a sensor fusion and road world model (RWM) management layer 236, a motion planning and control layer 238, and a behavioral planning and prediction layer 240. The layers 222-240 are merely examples of some layers in one example configuration of the vehicle processing system 200. In other configurations, other layers may be included, such as additional layers for other perception sensors (e.g., a lidar perception layer, etc.), additional layers for planning and/or control, additional layers for modeling, etc., and/or certain of the layers 222-240 may be excluded from the vehicle processing system 200. Each of the layers 222-240 may exchange data, computational results and commands as illustrated by the arrows in FIG. 2.

Further, the vehicle processing system 200 may receive and process data from sensors (e.g., radar, lidar, cameras, inertial measurement units (IMU) etc.), navigation information sources (e.g., Global Positioning System (GPS) receivers, IMUs, etc.), vehicle networks (e.g., Controller Area Network (CAN) bus), and databases in memory (e.g., digital map data).

The vehicle processing system 200 may output vehicle control commands or signals to an ADS vehicle control unit 242, which is a system, subsystem or computing device that interfaces directly with vehicle steering, throttle and brake controls. The configuration of the vehicle processing system 200 and ADS vehicle control unit 242 illustrated in FIG. 1 is merely an example configuration and other configurations of a vehicle management system and other vehicle components may be used. As an example, the configuration of the vehicle processing system 200 and ADS vehicle control unit 242 illustrated in FIG. 2 may be used in a vehicle configured for autonomous or semi-autonomous operation while a different configuration may be used in a non-autonomous vehicle.

The radar and/or lidar perception layer 222 may receive data from one or more detection and ranging sensors, such as radar and/or lidar, and process the data to recognize and determine locations of other vehicles and objects within a vicinity of the vehicle 102. The radar perception layer 222 may include use of neural network processing and artificial intelligence methods to recognize objects and vehicles, and pass such information on to the sensor fusion and RWM management layer 236.

The camera perception layer 224 may receive data from one or more cameras, such as cameras, and process the data to recognize and determine locations of other vehicles and objects within a vicinity of the vehicle 102. The camera perception layer 224 may include use of neural network processing and artificial intelligence methods to recognize objects and vehicles, and pass such information on to the sensor fusion and RWM management layer 236.

The positioning engine layer 226 may receive data from the radar and/or lidar perception layer 222, the camera perception layer 224, and various sources of navigation information, and process the data and information to determine a position of the vehicle 102. Various sources of navigation information may include, but is not limited to, a GPS receiver, an IMU, and/or other sources and sensors connected via a CAN bus. The positioning engine layer 226 may also utilize inputs from one or more cameras, such as cameras and/or any other available sensor capable of identifying and determining directions and distances to objects in the vicinity of the vehicle, such as radars, lidars, etc.

The map fusion and arbitration layer 230 may access the map database 228 for location information regarding nearby objects and features, and receive localizing/navigation information output from the positioning engine layer 226, and process the data to further determine the position of the vehicle 102 within the map, such as location within a lane of traffic, position within a street map, etc. sensor data may be stored in a memory (e.g., memory 312).

Similar to location information in some map objects and features and sensor accuracy and precision, GPS position fixes include some error, so the map fusion and arbitration layer 230 may function to determine a best guess location of the vehicle within a roadway based upon an arbitration between the GPS coordinates, sensor data, and map data regarding objects and features in and near the roadway. For example, while GPS coordinates may place the vehicle near the middle of a two-lane road in the sensor data, the map fusion and arbitration layer 230 may determine from the direction of travel that the vehicle is most likely aligned with the travel lane consistent with the direction of travel. The map fusion and arbitration layer 230 may pass arbitrated map location information to the sensor fusion and RWM management layer 236.

The route planning layer 232 may utilize sensor data, as well as inputs from an operator or dispatcher to plan a route to be followed by the vehicle 102 to a particular destination. The route planning layer 232 may pass map-based location information to the sensor fusion and RWM management layer 236. However, the use of a prior map by other layers, such as the sensor fusion and RWM management layer 236, etc., is not required. For example, other stacks may operate and/or control the vehicle based on perceptual data alone without a provided map, constructing lanes, boundaries, and the notion of a local map as perceptual data is received.

In embodiments including an operating mode assessment layer 234, that processing layer may use safety and/or confidence information regarding nearby objects and features to select an appropriate ADS driving mode. In some embodiments, the operating mode assessment layer 234 may determine whether the current autonomous or semi-autonomous driving mode is consistent with or appropriate in view of safety and/or confidence information regarding nearby objects and features in the driving environment.

The sensor fusion and RWM management layer 236 may receive data and outputs produced by the radar and/or lidar perception layer 222, camera perception layer 224, map fusion and arbitration layer 230, route planning layer 232, and the operating mode assessment layer 234, and use some or all of such inputs to estimate or refine the location and state of the vehicle 102 in relation to the road, other vehicles on the road, and other objects within a vicinity of the vehicle 102. For example, the sensor fusion and RWM management layer 236 may combine imagery data from the camera perception layer 224 with arbitrated map location information from the map fusion and arbitration layer 230 to refine the determined position of the vehicle within a lane of traffic. As another example, the sensor fusion and RWM management layer 236 may combine object recognition and imagery data from the camera perception layer 224 with object detection and ranging data from the radar and/or lidar perception layer 222 to determine and refine the relative position of other vehicles and objects in the vicinity of the vehicle. As another example, the sensor fusion and RWM management layer 236 may receive information from V2X communications (such as via the CAN bus) regarding other vehicle positions and directions of travel, and combine that information with information from the radar and/or lidar perception layer 222 and the camera perception layer 224 to refine the locations and motions of other vehicles. The sensor fusion and RWM management layer 236 may output refined location and state information of the vehicle 102, as well as refined location and state information of other vehicles and objects in the vicinity of the vehicle, to the motion planning and control layer 238 and/or the behavior planning and prediction layer 240.

As a further example, the sensor fusion and RWM management layer 236 may use dynamic traffic control instructions directing the vehicle 102 to change speed, lane, direction of travel, or other navigational element(s), and combine that information with other received information to determine refined location and state information. The sensor fusion and RWM management layer 236 may output the refined location and state information of the vehicle 102, as well as refined location and state information of other vehicles and objects in the vicinity of the vehicle 102, to the motion planning and control layer 238, the behavior planning and prediction layer 240 and/or devices remote from the vehicle 102, such as a data server, other vehicles, etc., via wireless communications, such as through C-V2X connections, other wireless connections, etc.

As a still further example, the sensor fusion and RWM management layer 236 may monitor perception data from various sensors, such as perception data from a radar and/or lidar perception layer 222, camera perception layer 224, other perception layer, etc., and/or data from one or more sensors themselves to analyze conditions in the vehicle sensor data. The sensor fusion and RWM management layer 236 may be configured to detect conditions in the sensor data, such as sensor measurements being at, above, or below a threshold, certain types of sensor measurements occurring, etc., and may output the sensor data as part of the refined location and state information of the vehicle 102 provided to the behavior planning and prediction layer 240 and/or devices remote from the vehicle 102, such as a data server, other vehicles, etc., via wireless communications, such as through C-V2X connections, other wireless connections, etc.

The behavioral planning and prediction layer 240 of the autonomous vehicle processing system 200 may use the refined location and state information of the vehicle 102 and location and state information of other vehicles and objects output from the sensor fusion and RWM management layer 236 to predict future behaviors of other vehicles and/or objects. For example, the behavioral planning and prediction layer 240 may use such information to predict future relative positions of other vehicles in the vicinity of the vehicle based on own vehicle position and velocity and other vehicle positions and velocity. Such predictions may take into account information from the map data and route planning to anticipate changes in relative vehicle positions as host and other vehicles follow the roadway. The behavioral planning and prediction layer 240 may output other vehicle and object behavior and location predictions to the motion planning and control layer 238.

Additionally, the behavior planning and prediction layer 240 may use object behavior in combination with location predictions to plan and generate control signals for controlling the motion of the vehicle 102. For example, based on route planning information, refined location in the roadway information, and relative locations and motions of other vehicles, the behavior planning and prediction layer 240 may determine that the vehicle 102 needs to change lanes and accelerate, such as to maintain or achieve minimum spacing from other vehicles, and/or prepare for a turn or exit. As a result, the behavior planning and prediction layer 240 may calculate or otherwise determine a steering angle for the wheels and a change to the throttle setting to be commanded to the motion planning and control layer 238 and ADS vehicle control unit 242 along with such various parameters necessary to effectuate such a lane change and acceleration. One such parameter may be a computed steering wheel command angle.

The motion planning and control layer 238 may receive data and information outputs from the sensor fusion and RWM management layer 236, map data from the map database 232, and other vehicle and object behavior as well as location predictions from the behavior planning and prediction layer 240, and use this information to plan and generate control signals for controlling the motion of the vehicle 102 and to verify that such control signals meet safety requirements for the vehicle 102. For example, based on route planning information, refined location in the roadway information, and relative locations and motions of other vehicles, the motion planning and control layer 238 may verify and pass various control commands or instructions to the ADS vehicle control unit 242.

The ADS vehicle control unit 242 may receive the commands or instructions from the motion planning and control layer 238 and translate such information into mechanical control signals for controlling wheel angle, brake and throttle of the vehicle 102. For example, ADS vehicle control unit 242 may respond to the computed steering wheel command angle by sending corresponding control signals to the steering wheel controller.

In various embodiments, the vehicle processing system 104 may communicate with other vehicle processing system participants (e.g., other vehicles, roadside units, etc.) via wireless communication links to transmit sensor data, position data, vehicle data and data gathered about the environment around the vehicle by onboard sensors. Such information may be used by other vehicle processing systems to update stored sensor data for relay to other vehicle processing systems (e.g., in other vehicles).

In various embodiments, the vehicle processing system 200 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 240 (or in a separate layer) may determine the current or future separate distance between another vehicle (as defined by the sensor fusion and RWM management layer 236) and the vehicle (e.g., based on the world model refined by the sensor fusion and RWM management layer 236), compare that separation distance to a safe separation distance parameter stored in memory, and issue instructions to the motion planning and control layer 238 to speed up, slow down or turn if the current or predicted separation distance violates the safe separation distance parameter. As another example, safety or oversight functionality in the motion planning and control layer 238 (or a separate layer) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 3A:
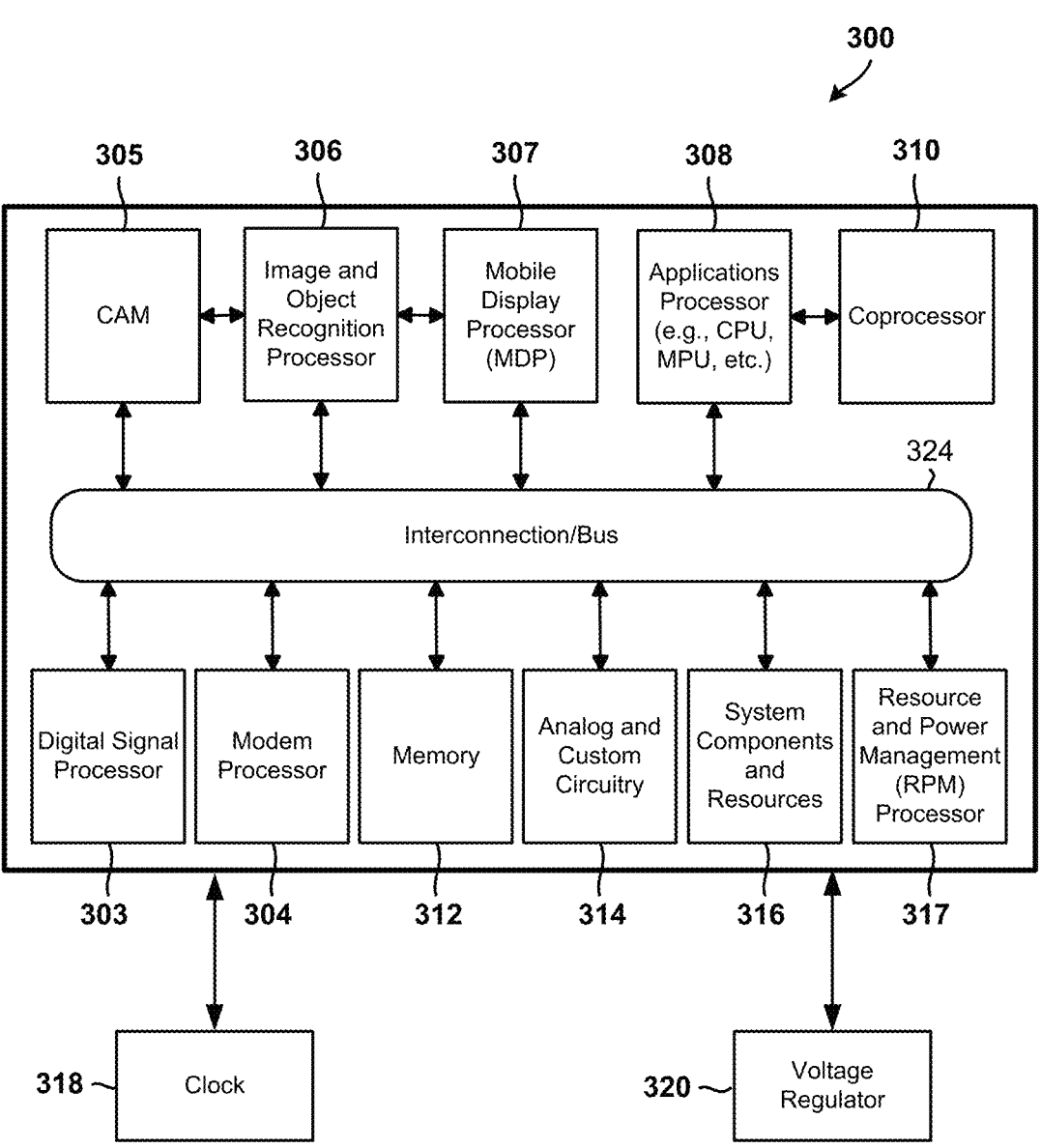
FIG. 3 is a block diagram illustrating components of a system on chip suitable for use in a vehicle processing system in accordance with various embodiments.

FIG. 3 is a block diagram illustrating example components of a system on chip (SOC) 300 suitable for use in a vehicle processing system in accordance with various embodiments. With reference to FIGS. 1-3, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317.

Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras via the CAM 305 to recognize and/or identify other vehicles, and otherwise perform functions of the camera perception layer 224 as described. In some embodiments, the processor 306 may be configured to process radar or lidar data and perform functions of the radar and/or lidar perception layer 222 as described.

The system components and resources 316, analog and custom circuitry 314, and/or CAM 305 may include circuitry to interface with peripheral devices, such as cameras, radar, lidar, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communications with a telephone network (e.g., 180), the Internet, and/or a network server (e.g., 114) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, Wi-Fi®, etc.), and other well-known components of modern electronic devices.

Figure 4A:
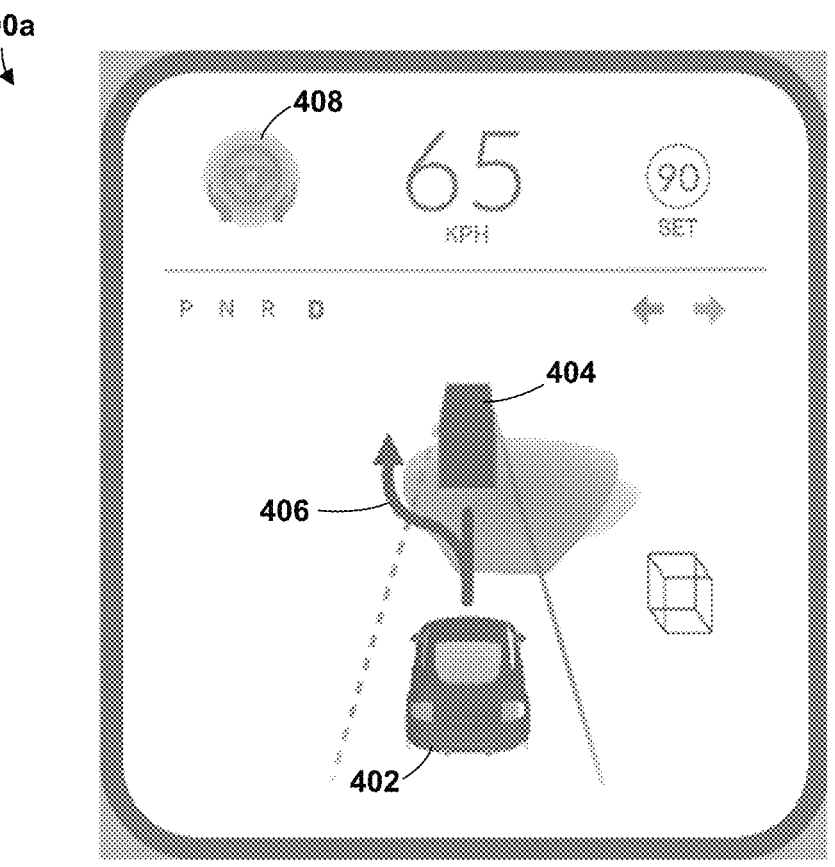
FIGS. 4A, 4B, and 4C are conceptual diagrams illustrating elements of informational displays that may be presented to a driver in accordance with various embodiments.
Figure 4B:
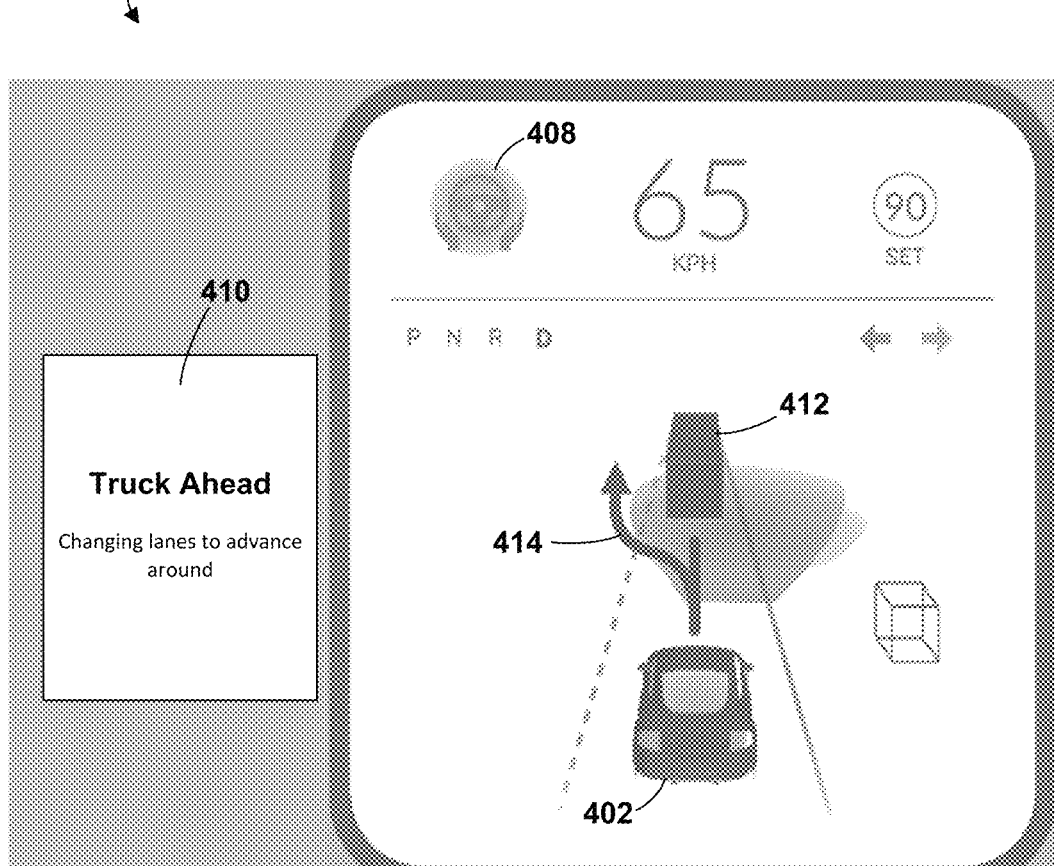
Figure 4C:
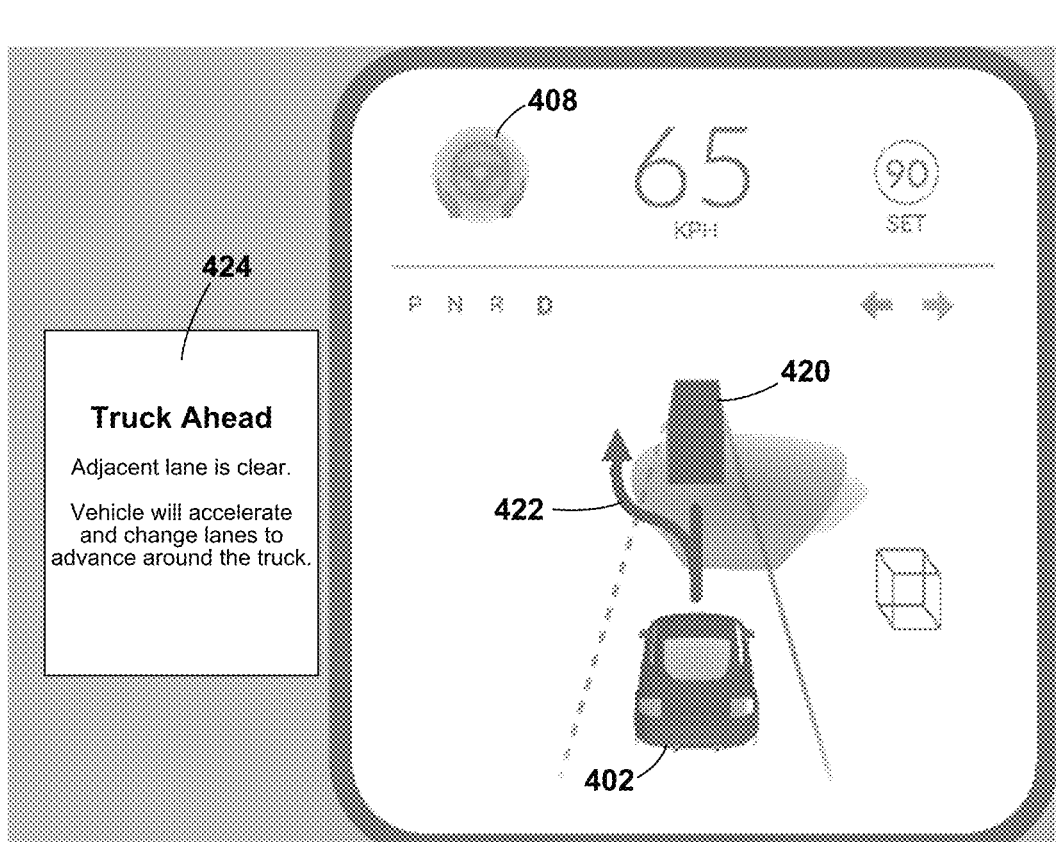

FIGS. 4A, 4B, and 4C are conceptual diagrams illustrating elements of informational displays 400a, 400b, and 400c that may be presented to a driver in accordance with various embodiments. With reference to FIGS. 1-4C, the informational displays 400a, 400b, and 400c may be implemented by a vehicle processing system (104, 200, 300) including one or more processors (e.g., 303, 304, 36, 307, 308, 310, 317).

The informational display 400a may include elements such as an indication of the driver's vehicle 402, an indication of a second vehicle 404 in front of the vehicle 402. The informational display 400a also may include an indication of a maneuver 406 (which is also referred to as a "first maneuver" below) that is planned by an ADS of the vehicle 402, or that the ADS has begun to execute. The informational display 400a also may include an indication of a driving status 408 of the vehicle 402, such as whether the vehicle is under control of the ADS (as indicated by the hand-off-wheel icon illustrated in FIG. 4A) or under the control of the driver. The informational display 400a also may include various other information, such as a vehicle speed, cruise control speed setting, a current gear setting of the vehicle, and/or other information.

In some embodiments, a vehicle processing system of the vehicle 402 may initiate the maneuver 406, which in this example is a maneuver to change lanes and pass the second vehicle 404. The vehicle processing system may recognize that the driver takes control of the vehicle 402 while the ADS performs the first driving maneuver 406, for example, in response to receiving one or more inputs from the driver assuming control of the vehicle 402. The vehicle processing system may monitor actions taken by the driver of the vehicle 402 after taking control to determine whether the driver performed a maneuver consistent with the first driving maneuver 406. For example, the driver may change lanes and pass the vehicle 404 in a consistent or substantially similar manner as planned by the ADS in the first driving maneuver 406.

In response to determining that the driver performed a driving maneuver consistent with the first driving maneuver 406, the vehicle processing system may present to the driver a first informational cue 410 before the ADS performs another driving maneuver that is consistent with the first driving maneuver. For example, referring to the informational display 400b illustrated in FIG. 4B, in a similar driving context the vehicle 402 may find itself behind another vehicle 412. The ADS of the vehicle 402 may plan and/or begin to execute a maneuver 414, which is similar to the first driving maneuver 406, to change lanes and pass the vehicle 412. The maneuver 414 may be consistent with the first driving maneuver 406 because the maneuver 414 may involve a similar driving context and one or more of a similar vehicle speed, a similar signaling action, or a similar steering action as in the maneuver 406.

The vehicle computing device also may present to the driver the first informational cue 410 before starting the maneuver 414. The first informational cue 410 includes information describing the planned driving maneuver that is consistent with the driving maneuver 414. For example, the first informational cue 410 may include the information that there is a truck ahead, and the vehicle 402 plans to change lanes to advance around the vehicle 412.

In some embodiments, the vehicle processing system may configure the first informational cue 410 in response to determining that the driver performed a maneuver consistent with the first driving maneuver 406. In such embodiments, the vehicle computing device may store the generated first informational 410 cue for presentation to the driver before the ADS performs another driving maneuver (e.g., 414) consistent with the first driving maneuver 406.

In some embodiments, the vehicle processing system may identify a driver reaction to the first informational cue 410 presented to the driver before a subsequent planned driving maneuver 414 that is consistent with the first driving maneuver 406 (for example, to maneuver around another vehicle 420). For example, the vehicle processing system may determine whether the driver takes control of the vehicle. For example, vehicle processing system may identify one or more driver behaviors that indicate whether the driver trusts the first informational cue 410. In some embodiments, based on the identified driver reaction, the vehicle computing device may adjust the first informational cue to generate an adjusted first informational cue 424. In some embodiments, the vehicle processing system may adjust the first informational cue 410 in response to identifying one or more driver behaviors that indicate that the driver does not trust the first informational cue 410.

Referring to the example illustrated in FIG. 4C, in response to determining that the driver assumed control (took over control) of the vehicle before during execution of the maneuver 414, the vehicle computing device may provide additional information about the maneuver 422, such as that ADS perceives that the adjacent lane is clear of traffic, and explaining in greater detail the planned maneuver 422, such as that the vehicle will accelerate and change lanes to advance around the vehicle 420. The vehicle processing system may store the adjusted first informational cue 424 for presentation to the driver the next time the ADS plans to perform a driving maneuver 422 consistent with the first driving maneuver 406.

In some embodiments, the vehicle processing system may recognize that the driver assumes control of the vehicle from the ADS unnecessarily during another (i.e., a second) driving maneuver planned by the ADS that is different from the first driving maneuver 406. For example, the vehicle processing system may initiate the another (i.e., a second) driving maneuver (which is different from the first driving maneuver 406). The vehicle processing system may recognize that the driver takes control of the vehicle while the ADS performs the second driving maneuver. The vehicle processing system may monitor driver actions after taking control of the vehicle to determine whether the driver performed a maneuver consistent with the second driving maneuver. In some embodiments, in response to determining that the driver performed a driving maneuver consistent with the another (i.e., a second) driving maneuver, the vehicle processing system may present to the driver a second informational cue that is different from the first informational cue before the ADS performs a driving maneuver that is consistent with the second driving maneuver.

In various embodiments, the vehicle processing system may store any generated, adjusted, or updated informational cues in a database for use in informing the driver before the ADS performs a plan driving maneuver that corresponds with one of the stored informational cues.

FIG. 5A is a process flow diagram illustrating an example method 500a performed by a processor of a vehicle processing system in a vehicle for dynamically adjusting informational cues presented to a driver in accordance with various embodiments. With reference to FIGS. 1-5, means for performing operations of the method 500a may include a processing system as described herein. A processing system may include one or more processors (e.g., 207, 303, 304, 306, 307, 308, 310) of a vehicle processing system (e.g., 104, 100, 200, 300) and/or hardware elements, any one or combination of which may be configured to perform any of the operations of the method 500a. Further, one or more processors within a processing system may be configured with software or firmware to perform various operations of the method. To encompass any of the processor(s), hardware elements and software elements that may be involved in performing the method 500a, the elements performing method operations are referred to generally as a "processing system."

In block 502, the processing system may recognize that a driver assumes control of a vehicle during an ADS-initiated first driving maneuver and then performs a driving maneuver within a threshold time that differs from the first driving maneuver by less than a threshold difference. As described above and in more detail with reference to FIG. 5B, the operations in block 502 may involve monitoring driver control of the vehicle as well as the vehicle track, speed and velocity for a threshold amount of time. Such monitoring may include determining whether the vehicle track, speed and velocity of any driver performed maneuver differs from the planned first driving maneuver by less than (or falls within) threshold differences for each feature of the maneuvers. As described, the threshold amount of time and the threshold differences for maneuver features may depend upon and be determined by the processing system based on vehicle track, speed and acceleration of the planned maneuver, as well as roadway and traffic conditions.

In block 504, the processing system may generate a first informational cue that will inform the driver about an ADS planned driving maneuver that is consistent with the first driving maneuver in response to determining that the driver performed a driving maneuver within a threshold time that differs from the first driving maneuver by less than a threshold difference. The first informational cue may include information describing the planned driving maneuver such as the type of maneuver, the planned actions that will be involved (e.g., speed changes, signaling, steering, etc.) and timing of the planned maneuver (e.g., a warning a set time before the maneuver begins, a countdown to the maneuver, and the like). As part of the operations in block 510, the processing system may store the generated first informational cue in a data structure (e.g., a table or database) that is configured for access by the processing system or the ADS before a similar future maneuver. Non-limiting examples of data structures that may be used for storing generated informational cues include flat files, spread sheets, data tables, indexed data bases or other searchable or indexed data structures. In some embodiments, the informational cue generated in block 504 may be selected based on a machine learning process that learns the behaviors and responses of the driver, and/or generated using a generative AI model trained to generate cues responsive to circumstances relating to an autonomous driving maneuver and driver behaviors.

In block 506, the processing system (or the ADS) may present to the driver the first informational cue generated in block 504 before the ADS performs another driving maneuver that is consistent with the first driving maneuver. In some embodiments, a planned ADS driving maneuver that is consistent with the first driving maneuver may include a planned driving maneuver that involves a similar driving context (e.g., considering roadway and traffic conditions)

and one or more of a similar vehicle speed, a similar signaling action, or a similar steering action as in the first driving maneuver.

FIGS. 5B-5E are process flow diagrams of an example operations 500b-500e that may be performed as part of the method 500a performed by a processor of a vehicle processing system in a vehicle for dynamically adjusting information presented to a driver in accordance with various embodiments. With reference to FIGS. 1-5E, means for performing the operations 500b-500e may include a processing system as described herein. A processing system may include one or more processors (e.g., 207, 303, 304, 306, 307, 308, 310) of a vehicle processing system (e.g., 104, 100, 200, 300) and/or hardware elements, any one or combination of which may be configured to perform any of the operations 500b-500e of the method 500a. Further, one or more processors within a processing system may be configured with software or firmware to perform various operations of the method. To encompass any of the processor(s), hardware elements and software elements that may be involved in performing the operations 500b-500e, the elements performing method operations are referred to generally as a "processing system."

FIG. 5B illustrates in further detail operations in method 500b that may be performed as part of the method 500a as described.

In block 510, the ADS may initiate a planned first driving maneuver. For example, the ADS may conclude that a maneuver other than simple road following in a safe manner considering surrounding traffic is appropriate, plan the vehicle steering, speed and acceleration features for the driving maneuver, and then begin to execute the maneuver when conditions are safe. The actions taken by the ADS in beginning the driving maneuver may be perceptible by the driver (e.g., featuring a change in speed, turn signal activation or steering wheel movement).

In block 512, the vehicle processing system and/or ADS may recognize and respond to the driver taking over from the ADS (e.g., via a driver input deactivating ADS, driver inputs to the steering wheel, break or accelerator, etc.), and respond by relinquishing control of the vehicle to the driver and at the same time storing the projected vehicle track, speed and acceleration profile of the planned ADS first driving maneuver that was interrupted by the driver takeover. Thus, the addition to the processes of a normal driver takeover, the vehicle processing system may temporarily store information regarding the planned maneuver that can be used to recognize when similar maneuvers are planned in the future. In addition to the projected vehicle track, speed and acceleration profile, the stored information may also include information regarding the roadway and surrounding traffic conditions at the time and location of the planned driving maneuver.

In optional block 514, the processing system may use the stored features of the projected track, speed and acceleration of the planned ADS first driving maneuver to obtain one or more of the threshold time, threshold distance, threshold speed difference and/or threshold acceleration difference. In some embodiments, such operations may include categorizing the planned driving maneuver (e.g., an immediate or roadway-based maneuver versus a maneuver around other vehicles) and then using a set of thresholds that are appropriate or preconfigured for the category of driving maneuver. In some embodiments, such operations may involve performing a table look up operation to obtain the different thresholds based on one or more aspects of the stored maneuver features. In some embodiments, such operations may involve applying the stored maneuver features to a trained machine learning model that has been trained to output the various threshold values that are appropriate to driving maneuvers with similar maneuver features.

In optional block 516, the processing system may access vehicle sensor and map data to obtain information regarding roadway and/or traffic conditions, and use that information as part of the basis for obtaining one or more of the threshold time, threshold distance, thresholds the difference and/or threshold acceleration difference.

In some embodiments, the processing system may use the obtained information to modify some or all of the various thresholds obtained in optional block 514. For example, if roadway and/or traffic conditions may be challenging to a driver, such as having curved roadway features, missing lane markers, wet pavement, dense surrounding traffic, and the like, the processing system may expand the threshold differences to monitor driver actions for a longer period of time and recognize a consistent driver initiated maneuver within a wider range of distance speed and acceleration differences.

In some embodiments, the operations in optional blocks 514 and 516 may be performed together such that the processing system obtains the water more thresholds based on a combination of the stored features of the projected driving maneuver and information regarding roadway and traffic conditions. In some embodiments, such operations may involve applying the stored maneuver features and information regarding roadway and/or traffic conditions to a trained machine learning model that has been trained to output the various threshold values that are appropriate to driving maneuvers with similar maneuver features, and roadway and traffic conditions.

In block 518, the processing system may start a driver maneuver monitoring timer that tracks the time since the driver took over control of the vehicle. For example, this timer may compare its current time value to the monitoring threshold time. As another example, this timer may be a countdown from the driver monitoring threshold time.

In block 520, the processing system and/or ADS may monitor driver performed vehicle maneuvers, such as by storing or buffering information regarding the vehicle's track, speed and acceleration during the monitoring period.

In determination block 522, the processing system may determine whether the time threshold has been reached. For example, the processing system may compare the value of the driver maneuver monitoring timer started in block 518 to the time threshold value to determine whether the differences zero or negative. As another example, the driver maneuver monitoring timer started in block 518 may be a countdown timer and the determination made in block 522 may be whether the driver maneuver monitoring timer has reached a zero.

So long as the time threshold has not been reached (i.e., determination block 522="No"), the processing system may continue to monitor driver controls of the vehicle in block 520.

In response to the time threshold being reached (i.e., determination block 522="Yes"), the processing system may compare the vehicle track speed and acceleration during the monitoring. To the stored projected track speed and acceleration profile of the planned ADS first driving maneuver in block 524. As described, this comparison may involve determining whether each of the maneuver features of any driver performed maneuver was within the corresponding difference threshold of the maneuvers features of the first driving maneuver.

In determination block 526, the processing system may determine whether the vehicle track, speed and/or acceleration differ from the stored projected track speed and acceleration profile of the first driving maneuver right greater than the respective difference thresholds.

In response to determining that the vehicle track, speed and/or acceleration during the monitoring period differs from the stored maneuver features of the first driving maneuver by more than the respective difference thresholds (i.e., determination block 526="Yes"), the processing system may delete the stored projected track speed and acceleration profile of the planned ADS driving maneuver in block 528 as that information is no longer in needed because the driver did not perform a similar maneuver. By the operations in block 528, the processing system may also store any information gathered while monitoring driver maneuvers in block 520 as such information is also no longer needed.

In response to determining that the vehicle track, speed and/or acceleration during the monitoring period differs from the stored maneuver features of the first driving maneuver by the same as or less than the respective difference thresholds, and thus fell within a threshold envelope of the maneuver features of the planned ADS driving maneuver (i.e., determination block 526="Yes"), the processing system may generate an informational cue for first driving maneuver in block 504 as described for the like numbered block of the method 500*a*.

In block 528, the processing system or ADS may store the informational cue generated in block 504 in a data structure (e.g., as a flat file, spread sheet, data table, indexed data base or other data structure) that links the queue to the stored projected track speed and acceleration profile of the planned ADS first driving maneuver. The data structure storing the informational cue linked to such maneuver features may be configured to enable the processing system or ADS to identify an appropriate informational cue for a future planned ADS driving maneuver by using projected vehicle track, speed and/or acceleration features as lookup or indexed values in the data structure. In some embodiments, the data structure may be in the form of a flat file, spread sheet or data table that is stored in memory and accessible by the processing system. In some embodiments the data structure may be a database that includes the maneuver features and corresponding informational cue indexed or otherwise organized in a relational manner to enable the processing system to identify the appropriate informational cue. The data structure generated in block 528 may then be used by the processing system or ADS to present to the driver the first informational cue before the ADS performs another ADS planned driving maneuver that is consistent with the first driving maneuver in block 506 as described for the like numbered block of the method 500*a*.

The operations in the method 500*b* may be performed whenever the ADS plans and initiates an ADS driving maneuver.

Figure 5C:
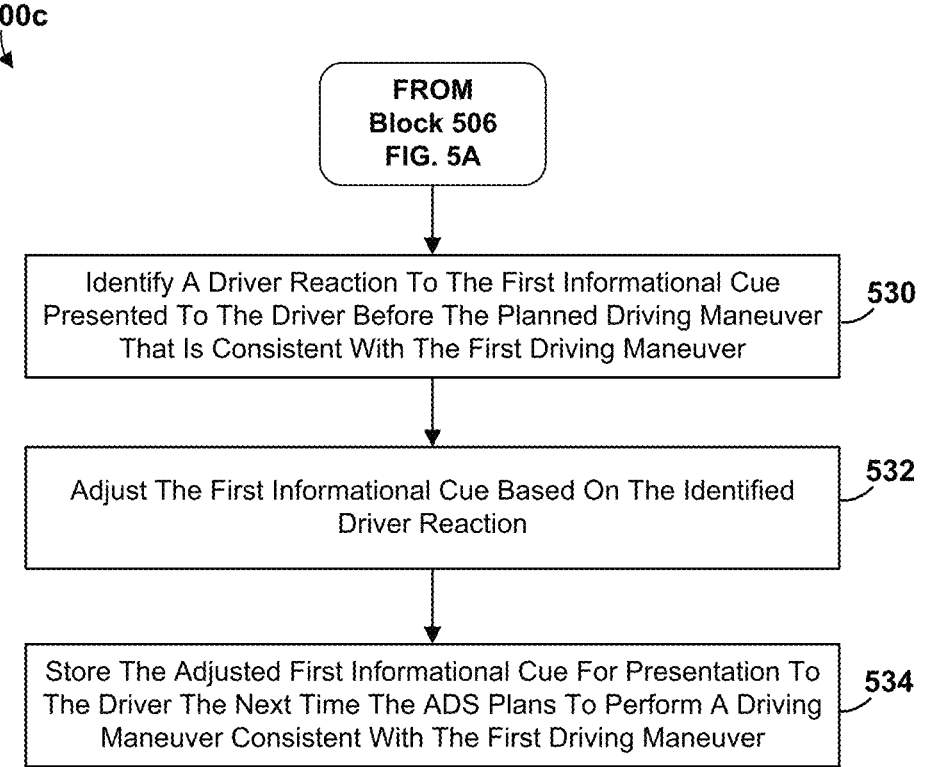

Referring to FIG. 5C, after the processing system presents to the driver a first informational cue before the ADS performs another driving maneuver that is consistent with the first driving maneuver in block 506 of the method 500*a* as described, the processing system may identify a driver reaction to the first informational cue presented to the driver before the planned driving maneuver in block 530. In some embodiments, identifying the driver reaction to the first informational cue may include identifying or recognizing one or more driver behaviors that indicate whether the driver trusts the first informational cue, such as by analyzing one or more of observed facial expressions, inappropriate gaze patterns, driver utterances, grip pressure on the steering wheel, pressure on the floorboard by the left foot, movement in the seat, initiating a risky driving maneuver (e.g., shortening the separation to vehicles ahead or driving in a manner that causes other vehicles to maneuver away), and combinations thereof. For example, if the driver grimaces in response to the informational cue, this may indicate that either the driver finds the informational cue to be irritating or that the driver remains uncomfortable with the ADS performing the driving maneuver associated with the cue. Regardless, this may inform the processing system that the informational cue needs to be improved, such as changing the manner in which the information is conveyed, presenting the queue earlier so that the driver has more time to anticipate the ADS plan maneuver, or make other adjustments to the cue.

In block 532, the processing system may adjust the first informational cue based on the identified driver reaction, such as adjusting the modality and/or display location of the cue. In some embodiments, the processing system may adjust or modify the first informational cue generated in block 532 using a machine learning process that learns the behaviors and responses of the driver, and/or generates a new informational cue using a generative AI model trained to generate cues responsive to circumstances relating to autonomous driving maneuvers and driver behaviors and reactions.

In block 534, the processing system may store the adjusted first informational cue for presentation to the driver the next time the ADS plans to perform a driving maneuver consistent with the first driving maneuver. For example, the processing system may store the adjusted first informational cue in the data structure generated in block 528 as described.

The processes of the method 500*c* illustrated in FIG. 5C may be repeated each time the first driving maneuver is performed and the corresponding informational cue is presented to the driver to improve the first informational cue until the driver exhibits acceptance or comfort with the ADS performing the first driving maneuver.

Referring to FIG. 5D, after the vehicle processing system recognizes that a driver assumes control of the vehicle during an ADS-initiated first driving maneuver and then performs a driving maneuver within a threshold time that differs from the first driving maneuver by less than a threshold difference in block 502 of the method 500*a* as described, the vehicle processing system may report to a remote computing system information identifying the first driving maneuver and relevant conditions at the time the driver took over from the ADS in block 542. This reporting may be to a fleet operations server, a crowdsource server, or other network computing device (e.g., 114). Such reporting may include the ADS planned autonomous driving maneuver, vehicle speed and other conditions, roadway conditions, surrounding traffic conditions, etc. In this manner the processing system may report information that the remote computing system may use to obtain or assemble information about informational cues presented to various drivers and whether the various drivers took control of their respective after presentation of their respective informational cues. This information may enable the remote computing system to generate informational cues appropriate for the various driving maneuvers and conditions that prompted drivers to take over unnecessarily, and then share those informational cues with other vehicles. For example, vehicle fleet operators may gather such information and generate a data structure (e.g., as a flat file, spread sheet, data table, indexed data base or other data structure) of informational cues that can be deployed on the vehicles within their fleet. As another example, vehicle owners may receive a data structure (e.g., as a flat file, spread sheet, data table, indexed data base or other data structure) of informational cues from crowd-source service, thus improving the safety and/or driver confidence in the vehicle's ADS.

In optional block 544, the vehicle processing system may also provide to the remote computing system the generated informational cue (e.g., the cue generated in block 504 as described) corresponding to the reported first driving maneuver and relevant conditions. This may enable the remote computing system gather informational cues that have been generated by various vehicles under the reported conditions. In this manner the remote computing system may gather a data structure (e.g., as a flat file, spread sheet, data table, indexed data base or other data structure) of vehicle-generated informational cues that can be shared with other vehicles, such as vehicles within a fleet or subscribing to a crowdsource service. In some embodiments, the remote computing system may compile vehicle-generated informational cues and generate amalgamated or averaged informational cues that can be shared with other vehicles, such as within a fleet or via a crowdsource service.

In optional block 546, the vehicle processing system may also provide to the remote computing system observations or information regarding how the driver reacted to an informational cue presented to the driver. In this manner, the remote computing system can gather information regarding how drivers react to various kinds of informational cues, which may enable to the remote computing system to generate new or modify existing or received informational cues that will be well received by most drivers (e.g., drivers in a fleet or subscribers to a crowdsource service).

In some embodiments, particularly embodiments in which vehicle processing systems provide to a remote computing system (e.g., a fleet operations server or crowdsource server or other network computing device) information on driving maneuvers and driving conditions in which drivers took over occurred in the method 500d, the vehicle processing system may be configured to receive a data structure (e.g., as a flat file, spread sheet, data table, indexed data base or other data structure) of informational cues and corresponding conditions (e.g., planned autonomous driving maneuver, vehicle speed and other conditions, roadway conditions, surrounding traffic conditions, etc.) from the remote computing system.

Referring to FIG. 5E, a method 500e for receiving and using such information by vehicle processing system is illustrated. The method 500e may be performed at any time during operations including before or after the vehicle processing system recognizes that a driver assumes control of a vehicle from an ADS unnecessarily during a first driving maneuver in block 502 of the method 500a as described In block 550, the processing system may receive from a network computing device information including informational cues and the corresponding conditions (e.g., planned autonomous driving maneuver, vehicle speed and other conditions, roadway conditions, surrounding traffic conditions, etc.) associated with the informational cues. In some embodiments, the corresponding conditions may be provided in a data structure (e.g., as a flat file, spread sheet, data table, indexed data base or other data structure) that is configured to enable the vehicle processing system to match current observed conditions to conditions when a provided informational cue should be presented to the driver. In some embodiments, the received informational cues and the corresponding conditions information may be stored in a data structure within memory within the vehicle that the processing system can access. In some embodiments, the informational cues and the corresponding conditions information may be stored in a data structure in a network-accessible device (e.g., an EDGE server or cloud-based data store) that the vehicle that the processing system can access via a wireless communication link at runtime.

In block 552, the processing system may monitor driving conditions and planned autonomous driving maneuvers to recognize when current conditions match or are similar to (e.g., within a threshold difference) of conditions when an informational cue provided by the remote computing system, and in response to recognizing there is a match or near match, generate an informational cue based at least in part on the informational cues received from the remote computing system. In this manner, the first informational cue may be generated through a table look up without the need for the driver to take over vehicle control and perform a driving maneuver consistent with the first driving maneuver planned by the ADS.

In block 554, the processing system may present to the driver the informational cue obtained or generated from the informational cues provided by the remote computing device. By presenting the informational cue to the driver before the ADS performs a driving maneuver under conditions associated with the informational cue, the driver may not take over control of the vehicle, allowing the ADS to remain in control of the vehicle.

Implementation examples are described in the following paragraphs. While some of the following implementation examples are described in terms of example methods, further example implementations may include: the example methods discussed in the following paragraphs implemented by a vehicle processing system that may be an on-board unit, mobile device unit, or mobile computing unit, or a processing system of a network computing device, including a processor configured with processor-executable instructions to perform operations of the methods of the following implementation examples; the example methods discussed in the following paragraphs implemented by a vehicle processing system or a processing system of a network computing device including means for performing functions of the methods of the following implementation examples; and the example methods discussed in the following paragraphs may be implemented as a non-transitory processor-readable storage medium having stored thereon processor-executable instructions configured to cause a processor of a vehicle processing system or a network computing device processing system to perform the operations of the methods of the following implementation examples.

Example 1. A method performed by a vehicle processing system for dynamically adjusting information presented to a driver, including: recognizing that a driver assumes control of a vehicle from an autonomous driving system (ADS) during an ADS-initiated first driving maneuver and then performs a driving maneuver within a threshold time that differs from the first driving maneuver by less than a threshold difference; and presenting to the driver a first informational cue before the ADS performs another driving maneuver that is consistent with the first driving maneuver in response to recognizing that the driver performed a driving maneuver within the threshold time that differed from the first driving maneuver by less than the threshold difference.

Example 2. The method of example 1, further including: generating the first informational cue in response to recognizing that the driver performed a driving maneuver within the threshold time that differed from the first driving maneuver by less than the threshold difference; and storing the generated first informational cue for presentation to the driver before the ADS performs another driving maneuver consistent with the first driving maneuver.

Example 3. The method of either of examples 1 or 2, in which recognizing that the driver performed the driving maneuver within the threshold time that differed from the first driving maneuver by less than the threshold difference includes: monitoring driver actions taken after assuming control of the vehicle for the threshold time; and recognizing the driver performed a driving maneuver during the threshold time that exhibited one or more of: a track of the driver performed driving maneuver differing from a planned track of the first driving maneuver by less than a threshold distance; a speed of the vehicle during the driver performed driving maneuver differing from a speed of the vehicle during the first driving maneuver by less than a threshold speed difference; or an acceleration of the driver performed driving maneuver differing from an acceleration of the first driving maneuver by less than a threshold acceleration difference.

Example 4. The method of example 3, further including using track, speed and acceleration features of the first driving maneuver to obtain one or more of the threshold time, the threshold distance, the threshold speed difference, or the threshold acceleration difference.

Example 5. The method of either of examples 3 or 4, further including: obtaining information regarding roadway conditions and traffic conditions when the ADS initiated the first driving maneuver; and using the information regarding roadway conditions and traffic conditions to obtain one or more of the threshold time, the threshold distance, the threshold speed difference, or the threshold acceleration difference.

Example 6. The method of any of examples 1-5, in which another driving maneuver that is consistent with the first driving maneuver includes an ADS planned driving maneuver that includes one or more of a driving maneuver with a steering action that is within a threshold difference of a steering action of the first driving maneuver and includes one or more of a vehicle speed within threshold speed difference of a vehicle speed at the time of the first driving maneuver, a similar signaling action as during the first driving maneuver, or a similar traffic condition as during the first driving maneuver.

Example 7. The method of any of examples 1-6, in which the first informational cue includes information describing an ADS planned driving maneuver that is consistent with the first driving maneuver.

Example 8. The method of any of examples 1-7, further including: monitoring driver reactions to the first informational cue presented to the driver before a planned driving maneuver that is consistent with the first driving maneuver; adjusting the first informational cue if a driver reaction indicates the driver reacted negatively to the first informational cue; and storing the adjusted first informational cue for presentation to the driver the next time the ADS plans to perform a driving maneuver consistent with the first driving maneuver.

Example 9. The method of any of examples 1-8, in which the first informational cue is stored in a data structure of informational cues linked to a plurality of ADS driving maneuvers that the vehicle processing system can access to obtain an appropriate informational cue for presentation to the driver before the ADS performs a corresponding planned driving maneuver.

Example 10. The method of any of examples 1-9, further including reporting to a remote computing system information identifying the first driving maneuver and relevant conditions at the time of the first driving maneuver in response to recognizing that the driver performed a driving maneuver within the threshold time that differed from the first driving maneuver by less than the threshold difference.

Example 11. The method of any of examples 1-10, further including: receiving, from a network computing device, information about informational cues and conditions associated with the informational cues; and presenting to the driver an informational cue received from the network computing device before the ADS performs another driving maneuver in response to determining that an ADS planned driving maneuver under conditions match or are similar to a driving maneuver and conditions associated with the informational cue.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a vehicle processing system, comprising:

determining that a driver assumes control of a vehicle from an autonomous driving system (ADS) during an ADS-initiated first driving maneuver;

determining a driving maneuver by the driver initiated within a threshold time differs from the first driving maneuver by less than a threshold difference, wherein the threshold time is based on a driver monitoring timer configured to track a time since the driver assumes the control of the vehicle; and presenting to the driver a first informational cue before the ADS performs an additional instance of the first driving maneuver in response to determining the driving maneuver by the driver initiated within the threshold time differs from the first driving maneuver by less than the threshold difference.

2. The method of claim 1, further comprising:

generating the first informational cue in response to determining the driving maneuver by the driver initiated within the threshold time differs from the first driving maneuver by less than the threshold difference; and storing the generated first informational cue for presentation to the driver before the ADS performs the additional instance of the first driving maneuver.

3. The method of claim 1, wherein determining the driving maneuver by the driver initiated within the threshold time differs from the first driving maneuver by less than the threshold difference comprises:

monitoring driver actions taken after assuming control of the vehicle for the threshold time; and determining the driving maneuver by the driver initiated within the threshold time that exhibited one or more of:

a track of the driver performed driving maneuver differing from a planned track of the first driving maneuver by less than a threshold distance;

a speed of the vehicle during the driver performed driving maneuver differing from a speed of the vehicle during the first driving maneuver by less than a threshold speed difference; or an acceleration of the driver performed driving maneuver differing from an acceleration of the first driving maneuver by less than a threshold acceleration difference.

4. The method of claim 3, further comprising using track, speed and acceleration features of the first driving maneuver to obtain one or more of the threshold time, the threshold distance, the threshold speed difference, or the threshold acceleration difference.

5. The method of claim 3, further comprising:

obtaining information regarding roadway conditions and traffic conditions when the ADS initiated the first driving maneuver; and using the information regarding roadway conditions and traffic conditions to obtain one or more of the threshold time, the threshold distance, the threshold speed difference, or the threshold acceleration difference.

6. The method of claim 1, wherein the additional instance of the first driving maneuver comprises an ADS planned driving maneuver that includes one or more of a driving maneuver with a steering action that is within a threshold difference of a steering action of the first driving maneuver and includes one or more of a vehicle speed within threshold speed difference of a vehicle speed at the time of the first driving maneuver, a signaling action that differs from a signaling action during the first driving maneuver by less than a signaling action threshold, or a traffic condition that differs from a traffic condition during the first driving maneuver by less than a traffic condition threshold.

7. The method of claim 1, wherein the first informational cue includes information describing an ADS planned driving maneuver that is the additional instance of the first driving maneuver.

8. The method of claim 1, further comprising:

monitoring driver reactions to the first informational cue presented to the driver before a planned driving maneuver that is the additional instance of the first driving maneuver;

adjusting the first informational cue if a driver reaction indicates the driver reacted negatively to the first informational cue; and storing the adjusted first informational cue for presentation to the driver a next time the ADS plans to perform the first driving maneuver.

9. The method of claim 1, wherein the first informational cue is stored in a data structure of informational cues linked to a plurality of ADS driving maneuvers that the vehicle processing system can access to obtain an appropriate informational cue for presentation to the driver before the ADS performs a corresponding planned driving maneuver.

10. The method of claim 1, further comprising reporting to a remote computing system information identifying the first driving maneuver and relevant conditions at the time of the first driving maneuver in response to determining the driving maneuver by the driver initiated within the threshold time differs from the first driving maneuver by less than the threshold difference.

11. The method of claim 1, further comprising:

receiving, from a network computing device, information about informational cues and conditions associated with the informational cues; and presenting to the driver an informational cue received from the network computing device before the ADS performs another driving maneuver in response to determining that an ADS planned driving maneuver under conditions match a driving maneuver and conditions associated with the informational cue.

12. A vehicle processing system, comprising:

a memory; and one or more processors coupled to the memory, wherein one or more processors are configured to:

determine that a driver assumes control of a vehicle from an autonomous driving system (ADS) during an ADS-initiated first driving maneuver;

determine a driving maneuver by the driver initiated within a threshold time differs from the first driving maneuver by less than a threshold difference, wherein the threshold time is based on a driver monitoring timer configured to track a time since the driver assumes the control of the vehicle; and present to the driver a first informational cue before the ADS performs an additional instance of the first driving maneuver in response to a determination of the driving maneuver by the driver initiated within the threshold time differs from the first driving maneuver by less than the threshold difference.

13. The vehicle processing system of claim 12, wherein one or more processors are further configured to:

generate the first informational cue in response to a determination of the driving maneuver by the driver initiated within the threshold time differs from the first driving maneuver by less than the threshold difference; and store the generated first informational cue for presentation to the driver before the ADS performs the additional instance of the first driving maneuver.

14. The vehicle processing system of claim 12, wherein one or more processors are further configured to a determination of the driving maneuver by the driver initiated within the threshold time differs from the first driving maneuver by less than the threshold difference by:

monitoring driver actions taken after assuming control of the vehicle for the threshold time; and determining the driving maneuver by the driver initiated within the threshold time that exhibited one or more of:

a track of the driver performed driving maneuver differing from a planned track of the first driving maneuver by less than a threshold distance;

a speed of the vehicle during the driver performed driving maneuver differing from a speed of the vehicle during the first driving maneuver by less than a threshold speed difference; or an acceleration of the driver performed driving maneuver differing from an acceleration of the first driving maneuver by less than a threshold acceleration difference.

15. The vehicle processing system of claim 14, wherein one or more processors are further configured to use track, speed and acceleration features of the first driving maneuver to obtain one or more of the threshold time, the threshold distance, the threshold speed difference, or the threshold acceleration difference.

16. The vehicle processing system of claim 14, wherein one or more processors are further configured to:

obtain information regarding roadway conditions and traffic conditions when the ADS initiated the first driving maneuver; and use the information regarding roadway conditions and traffic conditions to obtain one or more of the threshold time, the threshold distance, the threshold speed difference, or the threshold acceleration difference.

17. The vehicle processing system of claim 12, wherein the additional instance of the first driving maneuver comprises an ADS planned driving maneuver that includes one or more of a driving maneuver with a steering action that is within a threshold difference of a steering action of the first driving maneuver and includes one or more of a vehicle speed within threshold speed difference of a vehicle speed at the time of the first driving maneuver, a signaling action that differs from a signaling action during the first driving maneuver by less than a signaling action threshold, or a traffic condition that differs from a traffic condition during the first driving maneuver by less than a traffic condition threshold.

18. The vehicle processing system of claim 12, wherein the first informational cue includes information describing an ADS planned driving maneuver that is the additional instance of the first driving maneuver.

19. The vehicle processing system of claim 12, wherein one or more processors are further configured to:

monitor driver reactions to the first informational cue presented to the driver before a planned driving maneuver that is the additional instance of the first driving maneuver;

adjust the first informational cue if a driver reaction indicates the driver reacted negatively to the first informational cue; and store the adjusted first informational cue for presentation to the driver a next time the ADS plans to perform the first driving maneuver.

20. The vehicle processing system of claim 12, wherein the first informational cue is stored in a data structure of informational cues linked to a plurality of ADS driving maneuvers that the vehicle processing system can access to obtain an appropriate informational cue for presentation to the driver before the ADS performs a corresponding planned driving maneuver.

21. The vehicle processing system of claim 12, wherein one or more processors are further configured to report to a remote computing system information identifying the first driving maneuver and relevant conditions at the time of the first driving maneuver in response to determining the driving maneuver initiated within the threshold time differs from the first driving maneuver by less than the threshold difference.

22. The vehicle processing system of claim 12, wherein one or more processors are further configured to:

receive from a network computing device information about informational cues and conditions associated with the informational cues; and present to the driver an informational cue received from the network computing device before the ADS performs another driving maneuver in response to determining that an ADS planned driving maneuver under conditions match a driving maneuver and conditions associated with the informational cue.

23. A non-transitory processor-readable medium having stored thereon processor-executable instructions configured to cause a processing system of vehicle to perform operations comprising:

determine that a driver assumes control of the vehicle from an autonomous driving system (ADS) during an ADS-initiated first driving maneuver;

determine a driving maneuver by the driver initiated within a threshold time differs from the first driving maneuver by less than a threshold difference, wherein the threshold time is based on a driver monitoring timer configured to track a time since the driver assumes the control of the vehicle; and presenting to the driver a first informational cue before the ADS performs an additional instance of the first driving maneuver in response to a determination of the driving maneuver by the driver initiated within the threshold time differs from the first driving maneuver by less than the threshold difference.

24. The non-transitory processor-readable medium of claim 23, wherein the instructions are configured to cause the processing system of the vehicle to perform operations comprising:

generating the first informational cue in response to a determination of the driving maneuver initiated by the driver within the threshold time differs from the first driving maneuver by less than the threshold difference; and storing the generated first informational cue for presentation to the driver before the ADS performs the additional instance of the first driving maneuver.

25. The non-transitory processor-readable medium of claim 23, wherein, to determine the driving maneuver by the driver initiated within the threshold time differs from the first driving maneuver by less than the threshold difference, the instructions are configured to cause the processing system of the vehicle to perform operations comprising:

monitoring driver actions taken after assuming control of the vehicle for the threshold time; and determining the driving maneuver by the driver during the threshold time that exhibited one or more of:

a track of the driver performed driving maneuver differing from a planned track of the first driving maneuver by less than a threshold distance;

a speed of the vehicle during the driver performed driving maneuver differing from a speed of the vehicle during the first driving maneuver by less than a threshold speed difference; or an acceleration of the driver performed driving maneuver differing from an acceleration of the first driving maneuver by less than a threshold acceleration difference.

26. The non-transitory processor-readable medium of claim 25, wherein the instructions are configured to cause the processing system of the vehicle to perform operations comprising using track, speed and acceleration features of the first driving maneuver to obtain one or more of the threshold time, the threshold distance, the threshold speed difference, or the threshold acceleration difference.

27. The non-transitory processor-readable medium of claim 25, wherein the instructions are configured to cause the processing system of the vehicle to perform operations comprising:

obtaining information regarding roadway conditions and traffic conditions when the ADS initiated the first driving maneuver; and using the information regarding roadway conditions and traffic conditions to obtain one or more of the threshold time, the threshold distance, the threshold speed difference, or the threshold acceleration difference.

28. The non-transitory processor-readable medium of claim 23, wherein the additional instance of the first driving maneuver comprises an ADS planned driving maneuver that includes one or more of a driving maneuver with a steering action that is within a threshold difference of a steering action of the first driving maneuver and includes one or more of a vehicle speed within threshold speed difference of a vehicle speed at the time of the first driving maneuver, a signaling action that differs from a signaling action during the first driving maneuver by less than a signaling action threshold, or a traffic condition that differs from a traffic condition during the first driving maneuver by less than a traffic condition threshold.

29. The non-transitory processor-readable medium of claim 23, wherein the first informational cue includes information describing an ADS planned driving maneuver that is the additional instance of the first driving maneuver.

30. The non-transitory processor-readable medium of claim 23, wherein the instructions are configured to cause the processing system of the vehicle to perform operations comprising:

monitoring driver reactions to the first informational cue presented to the driver before a planned driving maneuver that is the additional instance of the first driving maneuver;

adjusting the first informational cue if a driver reaction indicates the driver reacted negatively to the first informational cue; and storing the adjusted first informational cue for presentation to the driver a next time the ADS plans to perform the first driving maneuver.

* * * * *